United States Patent
Ito

(10) Patent No.: US 9,204,318 B2
(45) Date of Patent: Dec. 1, 2015

(54) WIRELESS COMMUNICATION SYSTEM, MOBILE STATION, BASE STATION, AND WIRELESS COMMUNICATION METHOD FOR REDUCING INTERFERENCE OF DATA

(71) Applicant: FUJITSU LIMITED, Kawasaki-shi, Kanagawa (JP)

(72) Inventor: Akira Ito, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 53 days.

(21) Appl. No.: 14/027,462

(22) Filed: Sep. 16, 2013

(65) Prior Publication Data

US 2014/0018062 A1 Jan. 16, 2014

Related U.S. Application Data

(63) Continuation of application No. PCT/JP2011/056653, filed on Mar. 18, 2011.

(51) Int. Cl.
*H04B 1/00* (2006.01)
*H04B 1/04* (2006.01)
(Continued)

(52) U.S. Cl.
CPC ............. *H04W 24/02* (2013.01); *H04J 11/004* (2013.01); *H04J 11/005* (2013.01); *H04W 16/16* (2013.01); *H04J 2211/001* (2013.01)

(58) Field of Classification Search
CPC ....... H04B 15/00; H04W 24/02; H04W 28/04
USPC ........................ 455/63.1, 63.2, 114.2, 422.1
See application file for complete search history.

(56) References Cited

U.S. PATENT DOCUMENTS

2005/0068918 A1 3/2005 Mantravadi et al.
2007/0223423 A1 9/2007 Kim et al.
(Continued)

FOREIGN PATENT DOCUMENTS

EP 1 318 613 A2 6/2003
EP 2 280 492 A1 2/2011
(Continued)

OTHER PUBLICATIONS

Extended European search report including the supplementary European search report and the European search opinion issued for corresponding European Patent Application No. 11861672.1 dated Jul. 31, 2014.
(Continued)

*Primary Examiner* — Rafael Pérez-Gutiérrez
*Assistant Examiner* — Mark G. Pannell
(74) *Attorney, Agent, or Firm* — Myers Wolin, LLC

(57) ABSTRACT

The mobile station receives a wireless signal containing a transmission signal of the macro base station and a transmission signal of the home base station. The mobile station includes a control information receiving unit and a reception processing unit. The control information receiving unit receives first control information used for a process of receiving the transmission signal of the macro base station and second control information used for a process of receiving the transmission signal of the home base station. The reception processing unit demodulates and decodes a signal based on the first control information, where the signal is obtained by reducing a component of the transmission signal of the home base station from the wireless signal by using information obtained by demodulating and decoding the transmission signal of the home base station based on the second control information.

8 Claims, 18 Drawing Sheets

(51) Int. Cl.
*H04W 24/02* (2009.01)
*H04W 16/16* (2009.01)
*H04J 11/00* (2006.01)

(56) References Cited

U.S. PATENT DOCUMENTS

| | | | |
|---|---|---|---|
| 2009/0264142 A1 | 10/2009 | Sankar et al. | |
| 2010/0009634 A1 | 1/2010 | Budianu et al. | |
| 2010/0029213 A1* | 2/2010 | Wang | 455/63.1 |
| 2010/0190447 A1* | 7/2010 | Agrawal et al. | 455/63.1 |
| 2010/0222062 A1 | 9/2010 | Chou et al. | |
| 2010/0226356 A1 | 9/2010 | Sahin et al. | |
| 2010/0291877 A1* | 11/2010 | Mashino et al. | 455/63.1 |
| 2010/0323711 A1* | 12/2010 | Damnjanovic et al. | 455/450 |
| 2011/0013568 A1 | 1/2011 | Yim et al. | |
| 2011/0092231 A1* | 4/2011 | Yoo et al. | 455/501 |
| 2011/0274097 A1* | 11/2011 | Zhang et al. | 370/338 |
| 2012/0034926 A1* | 2/2012 | Damnjanovic et al. | 455/450 |
| 2012/0044928 A1* | 2/2012 | Bhattad et al. | 370/350 |
| 2012/0071103 A1* | 3/2012 | Kadous et al. | 455/63.1 |
| 2012/0113961 A1* | 5/2012 | Krishnamurthy | 370/332 |
| 2012/0135743 A1 | 5/2012 | Ebiko et al. | |
| 2012/0155411 A1* | 6/2012 | Ancora et al. | 370/329 |

FOREIGN PATENT DOCUMENTS

| | | |
|---|---|---|
| JP | 2010-171885 | 8/2010 |
| JP | 2010-246097 | 10/2010 |
| JP | 2011-024195 | 2/2011 |
| JP | 2012-023598 | 2/2012 |
| KR | 10-2011-0026519 A | 3/2011 |
| WO | 2005-032035 | 4/2005 |
| WO | 2007-109630 | 9/2007 |
| WO | 2010/003034 A1 | 1/2010 |
| WO | 2011-021388 | 2/2011 |

OTHER PUBLICATIONS

Notice of Preliminary Rejection issued for corresponding Korean Patent Application No. 10-2013-7024558 mailed Nov. 10, 2014, with an English translation.
International Search Report issued for corresponding international patent application No. PCT/JP2011/056653, mailed Apr. 12, 2011.
Office Action issued for corresponding Korean Patent Application No. 10-2013-7024558 mailed May 12, 2015 with an English translation.
Communication pursuant to Article 94(3) EPC issued for corresponding European Office Action Application No. 11 861 672.1 dated Aug. 5, 2015.

* cited by examiner

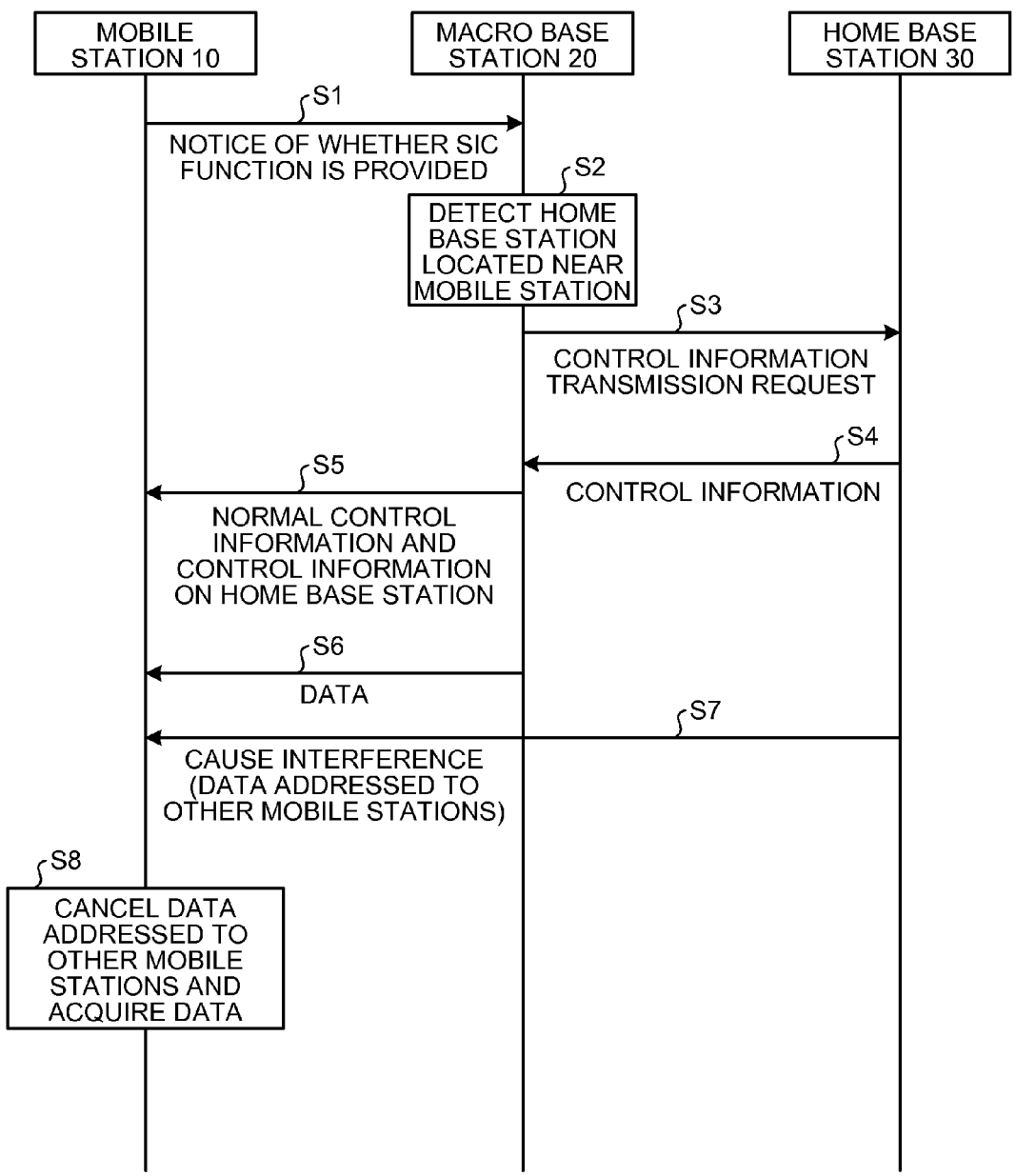

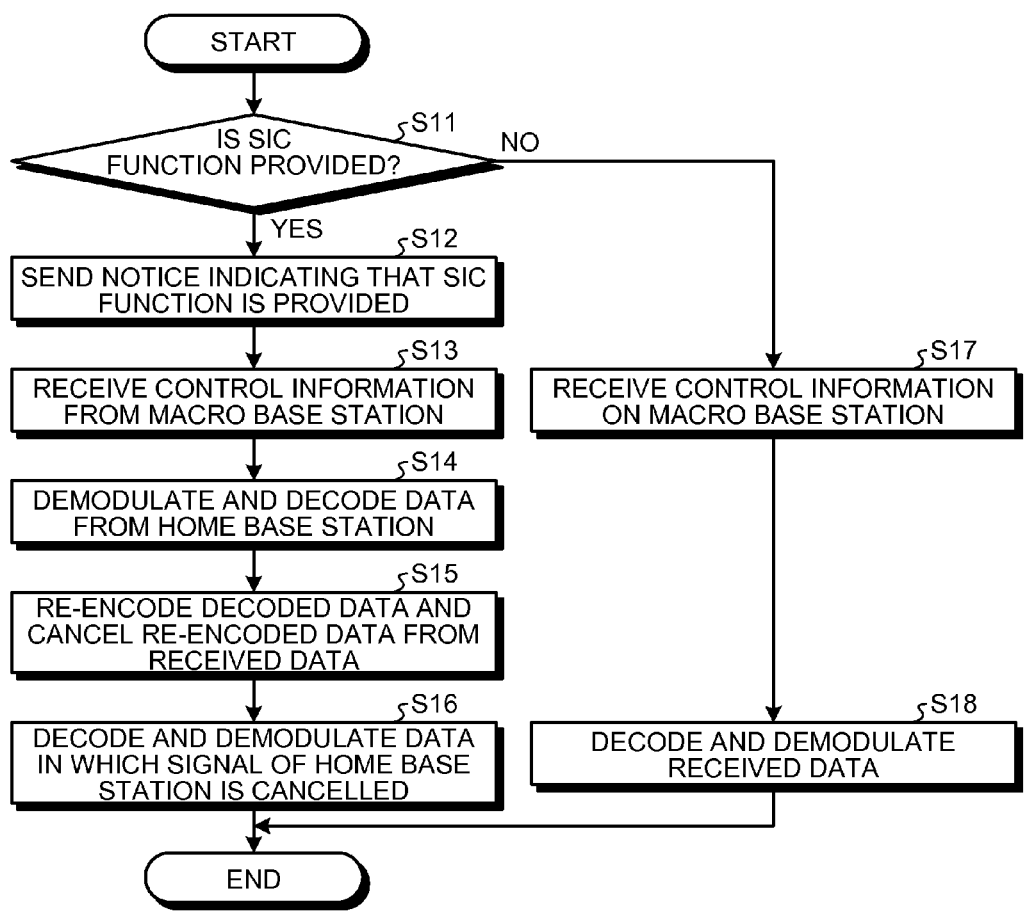

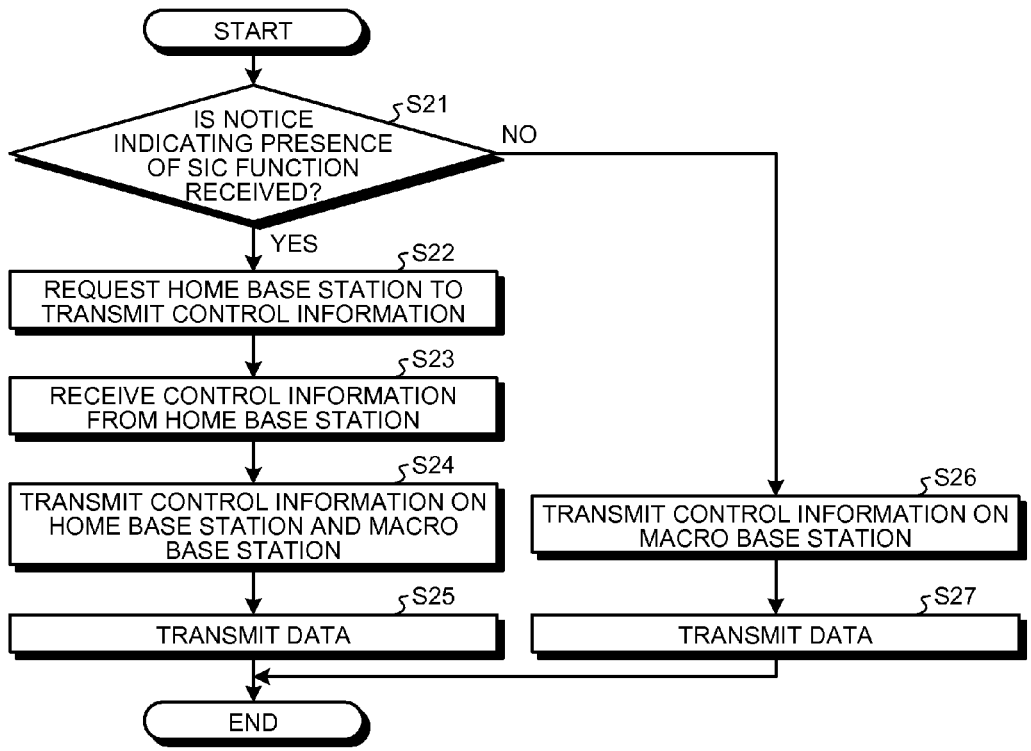
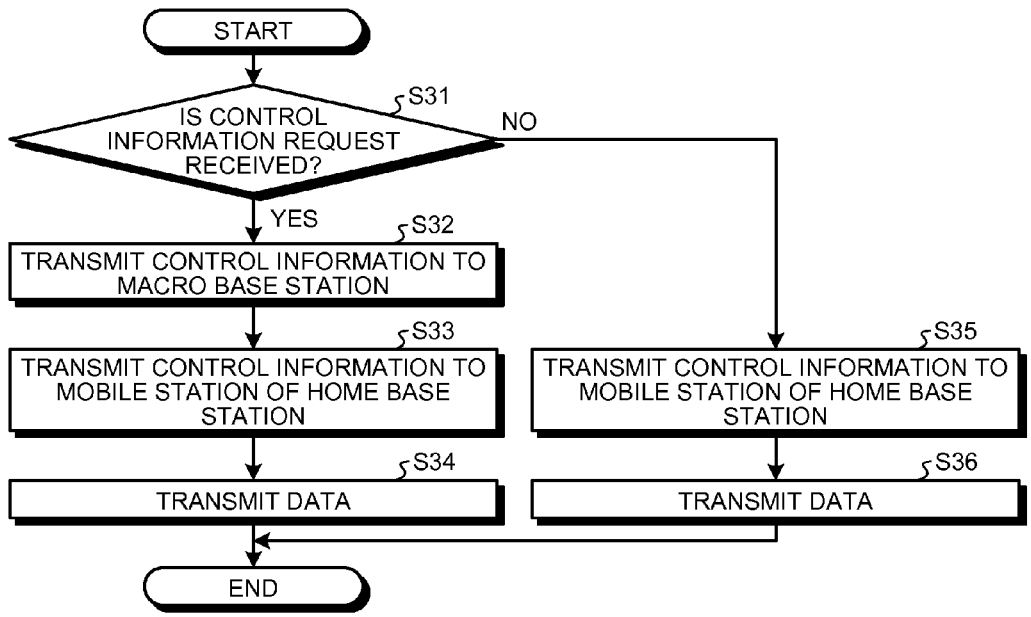

WIRELESS COMMUNICATION SYSTEM, MOBILE STATION, BASE STATION, AND WIRELESS COMMUNICATION METHOD FOR REDUCING INTERFERENCE OF DATA

CROSS-REFERENCE TO RELATED APPLICATION

This application is a continuation application of International Application PCT/JP2011/056653, filed on Mar. 18, 2011, now pending, the contents of which are herein wholly incorporated by reference.

FIELD

The embodiments discussed herein are directed to a wireless communication system, a mobile station, a base station, and a wireless communication method.

BACKGROUND

Conventionally, with the development of wireless communication technologies, a base station (home base station) that is intended to be used in a specific area has been proposed in addition to a base station (macro base station) used for general mobile phones. The home base station has a smaller radio coverage than the macro base station. However, because the home base station is intended to be installed mainly in homes or small offices, mobile stations that are allowed to communicate with the home base station can access the home base station. Therefore, in general, to use the home base station, a user of a mobile station registers the mobile station in advance so that the home base station can perform wireless communication with the mobile station.

Patent Literature 1: Japanese National Publication of International Patent Application No. 2009-530987
Patent Literature 2: Japanese National Publication of International Patent Application No. 2007-507187
Patent Literature 3: Japanese Laid-open Patent Publication No. 2012-023598
Patent Literature 4: Japanese Laid-open Patent Publication No. 2010-171885

However, the above conventional technology has a problem as described below. FIG. 23 is a diagram illustrating a situation where a mobile station located in an area of a macro base station is interfered with by a home base station. As illustrated in FIG. 23, when a mobile station 100 is located in an area A17 of a macro base station B1, the mobile station 100 may be interfered with by a home base station B2 located in an area A18. Specifically, when the mobile station 100 does not have the right to access the home base station B2, the mobile station 100 is not enabled to communicate with the home base station B2 even though the mobile station 100 is located near the home base station B2. In this state, if the mobile station 100 communicates with the macro base station B1, because the power received from the macro base station B1 is weaker than the power received from the home base station B2, the mobile station 100 has to receive weak signals with greater interference, resulting in reduced reception quality.

To reduce the degradation of the reception quality, a method for limiting power or resource allocation in the home base station has been proposed. However, with this method, while the interference of mobile stations of the macro base station by the home base station can be reduced, the throughput of the home base station may be lowered at the same time.

SUMMARY

According to an aspect of the embodiments, a wireless communication system includes: a first base station; a second base station; and a mobile station that receives a wireless signal containing a transmission signal of the first base station and a transmission signal of the second base station. The mobile station includes: a transmitting unit that transmits information indicating a type of a receiving circuit of the mobile station to the first base station; and a receiving unit that receives first control information used for a process of receiving the transmission signal of the first base station and receives second control information used for a process of receiving the transmission signal of the second base station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating operation of the wireless communication system according to the first embodiment;
FIG. 9 is a flowchart illustrating operation of the mobile station according to the first embodiment;
FIG. 10 is a flowchart illustrating operation of the macro base station according to the first embodiment;
FIG. 11 is a flowchart illustrating operation of the home base station according to the first embodiment.

DESCRIPTION OF EMBODIMENTS

Preferred embodiments of a wireless communication system, a mobile station, a base station, and a wireless communication method according to a disclosed invention will be explained in detail below with reference to accompanying drawings. The present invention is not limited to the embodiments below.

First Embodiment

Figure 1:
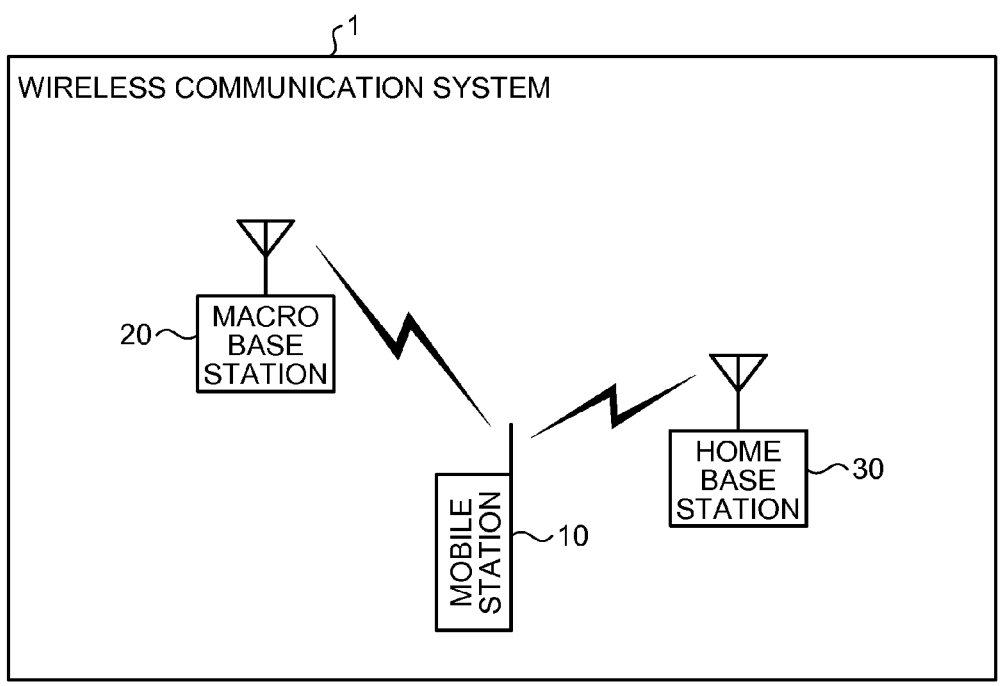
FIG. 1 is a diagram illustrating a configuration of a wireless communication system.

A configuration of a wireless communication system according to one embodiment of the disclosed invention will be explained below. FIG. 1 is a diagram illustrating a configuration of the wireless communication system. As illustrated in FIG. 1, a wireless communication system 1 includes a mobile station 10, a macro base station 20, and a home base station 30, which will be described below. The mobile station 10 receives a wireless signal containing a transmission signal of the macro base station 20 and a transmission signal of the home base station 30. The mobile station 10 is enabled to communicate with the macro base station 20. However, the mobile station 10 is not registered in the home base station 30 and is not enabled to transmit and receive data to and from the home base station 30. The mobile station 10 transmits information indicating that the mobile station 10 has an interference reduction function to the macro base station 20. The macro base station 20 receives the information transmitted by the mobile station 10, and transmits, to the home base station 30, a request signal for requesting transmission of control information used for a process of receiving a transmission signal of the home base station 30, in response to reception of the information. The home base station 30 receives the request signal transmitted by the macro base station 20, and transmits the control information used for the process of receiving the transmission signal of the home base station 30, in response to reception of the request signal.

Figure 2:
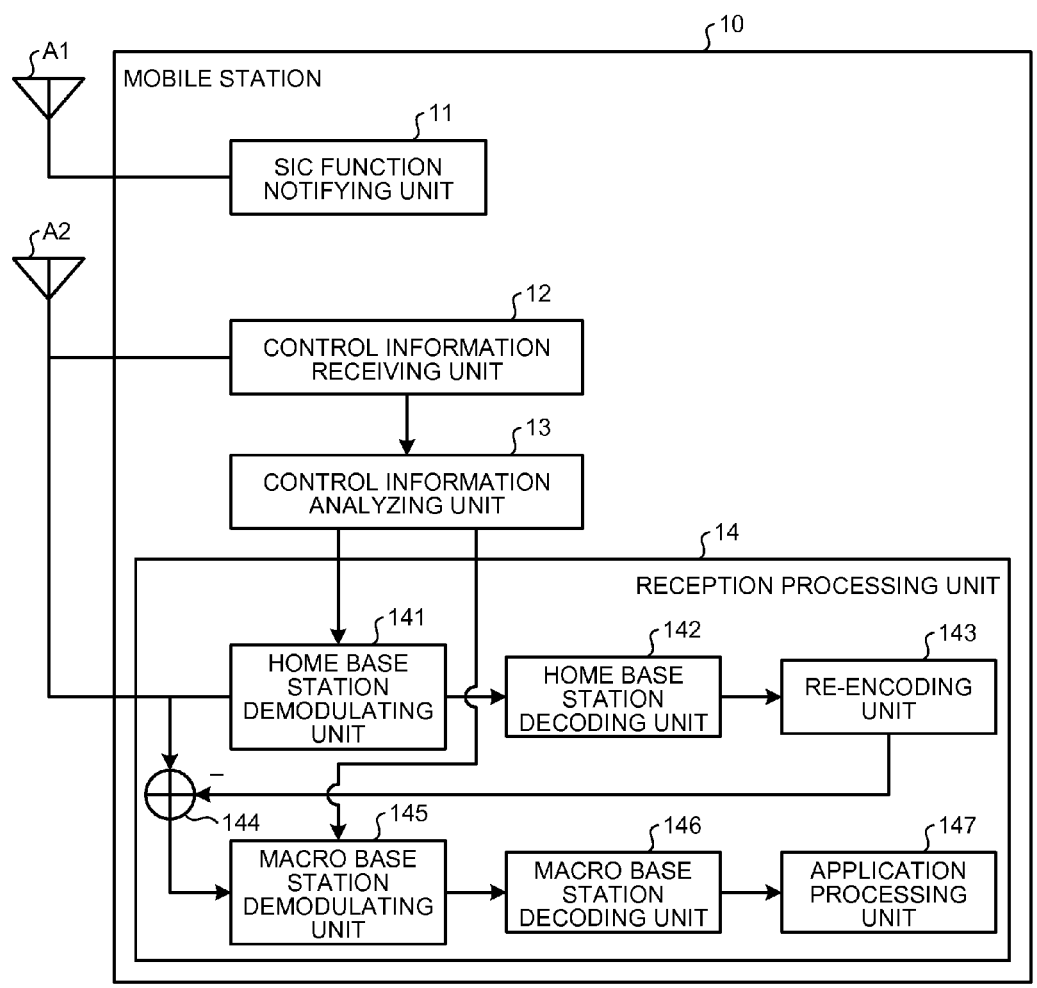
FIG. 2 is a diagram illustrating a functional configuration of a mobile station according to a first embodiment.

FIG. 2 is a diagram illustrating a configuration of the mobile station according to the first embodiment. As illustrated in FIG. 2, the mobile station 10 includes an SIC function notifying unit 11, a control information receiving unit 12, a control information analyzing unit 13, and a reception processing unit 14. In addition, the reception processing unit 14 includes a home base station demodulating unit 141, a home base station decoding unit 142, a re-encoding unit 143, a subtracting unit 144, a macro base station demodulating unit 145, a macro base station decoding unit 146, and an application processing unit 147. All of the components are connected to one another such that signals and data can be input and output unidirectionally or bidirectionally.

When the mobile station 10 has an SIC function, the SIC function notifying unit 11 notifies the macro base station 20 that the mobile station 10 has the SIC function via an antenna A1. The control information receiving unit 12 receives, via an antenna A2, control information transmitted by the macro base station 20 via a control channel. The control information is used for scheduling to enable the mobile station 10 to receive data transmitted by the macro base station 20. In some cases, the SIC function may be implemented in an MIMO (Multiple Input Multiple Output) receiver in advance. In this case, the SIC function notifying unit 11 can also function as the control information receiving unit 12. The control information analyzing unit 13 determines which one of the macro base station 20 and the home base station 30 has transmitted the control information received by the control information receiving unit 12. The control information analyzing unit 13 outputs the control information to a demodulating unit of the base station serving as a transmission source of the control information according to a determination result.

The home base station demodulating unit 141 demodulates the transmission signal of the home base station 30 according to a predetermined modulation scheme based on the control information input by the control information analyzing unit 13, and restores an original signal wave. The home base station demodulating unit 141 outputs the demodulated transmission signal to the home base station decoding unit 142. The home base station decoding unit 142 decodes the transmission signal input by the home base station demodulating unit 141 according to a predetermined decoding scheme based on the control information, and restores an original transmission signal. The home base station decoding unit 142 outputs the decoded transmission signal to the re-encoding unit 143. The re-encoding unit 143 re-encodes the transmission signal input by the home base station decoding unit 142 into a format so that the component of the transmission signal can be reduced, and outputs the re-encoded signal to the subtracting unit 144.

The subtracting unit 144 generates a signal, in which the component of the transmission signal of the home base station 30 is reduced, based on the transmission signals received from the macro base station 20 and the home base station 30 by using the information obtained by modulating, decoding, and re-encoding the transmission signal of the home base station 30 based on the control information. The macro base station demodulating unit 145 demodulates the generated signal according to a predetermined modulation scheme based on the control information input by the control information analyzing unit 13. The macro base station demodulating unit 145 outputs the demodulated signal to the macro base station decoding unit 146. The macro base station decoding unit 146 decodes the signal input by the macro base station demodulating unit 145 according to a predetermined decoding scheme based on the control information on the macro base station 20. The macro base station decoding unit 146 outputs the decoded signal to the application processing unit 147. The application processing unit 147 performs predetermined application processing by using a signal, in which the component of the transmission signal of the home base station 30 is reduced.

Figure 3:
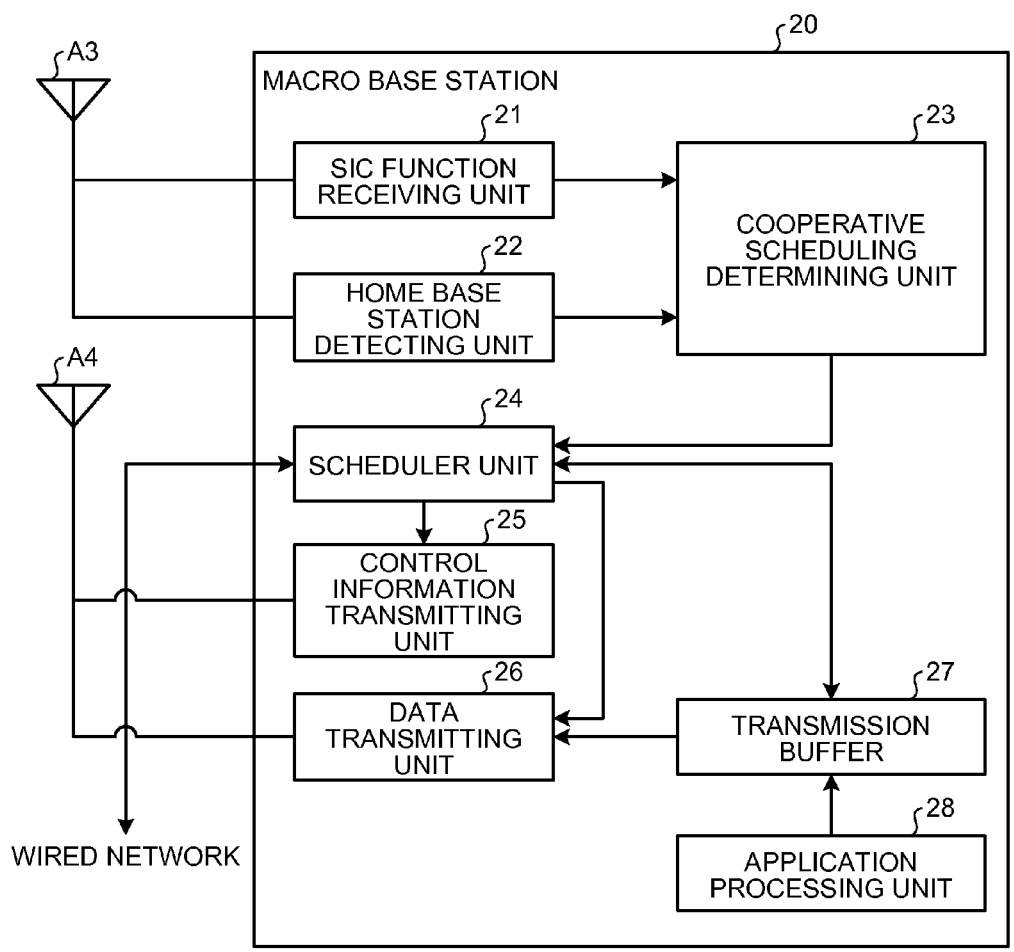
FIG. 3 is a diagram illustrating a functional configuration of a macro base station according to the first embodiment.

FIG. 3 is a diagram illustrating a functional configuration of the macro base station 20 according to the first embodiment. The macro base station 20 includes an SIC function receiving unit 21, a home base station detecting unit 22, a cooperative scheduling determining unit 23, a scheduler unit 24, a control information transmitting unit 25, a data transmitting unit 26, a transmission buffer 27, and an application processing unit 28. All of the components are connected to one another such that signals and data can be input and output unidirectionally or bidirectionally.

The SIC function receiving unit 21 receives a notice of whether the mobile station 10 has the SIC function from the mobile station 10 via an antenna A3. The home base station detecting unit 22 determines whether or not the mobile station 10 is located near the home base station 30 based on a neighboring base station measurement result notified by the mobile station 10. The cooperative scheduling determining unit 23 determines whether scheduling for reducing interference from the home base station 30 is needed, based on presence or absence of the SIC function input by the SIC function receiving unit 21 and based on the measurement result input by the home base station detecting unit 22.

The scheduler unit 24 transmits a control information transmission request to the home base station 30 based on the determination result obtained by the cooperative scheduling determining unit 23, and receives the control information transmitted by the home base station 30 as a response to the request. The control information transmitting unit 25 transmits the control information on the macro base station 20 and the control information on the home base station 30 to the mobile station 10 via an antenna A4 in accordance with an instruction input by the scheduler unit 24. The data transmitting unit 26 transmits data to the mobile station 10 via the antenna A4 in accordance with an instruction input by the scheduler unit 24. The transmission buffer 27 provides the data transmitting unit 26 with the data to be transmitted to the mobile station 10 based on an instruction from the scheduler unit 24. The application processing unit 28 outputs, to the transmission buffer 27, the data that is to be transmitted and that has been processed by a predetermined application.

Figure 4:
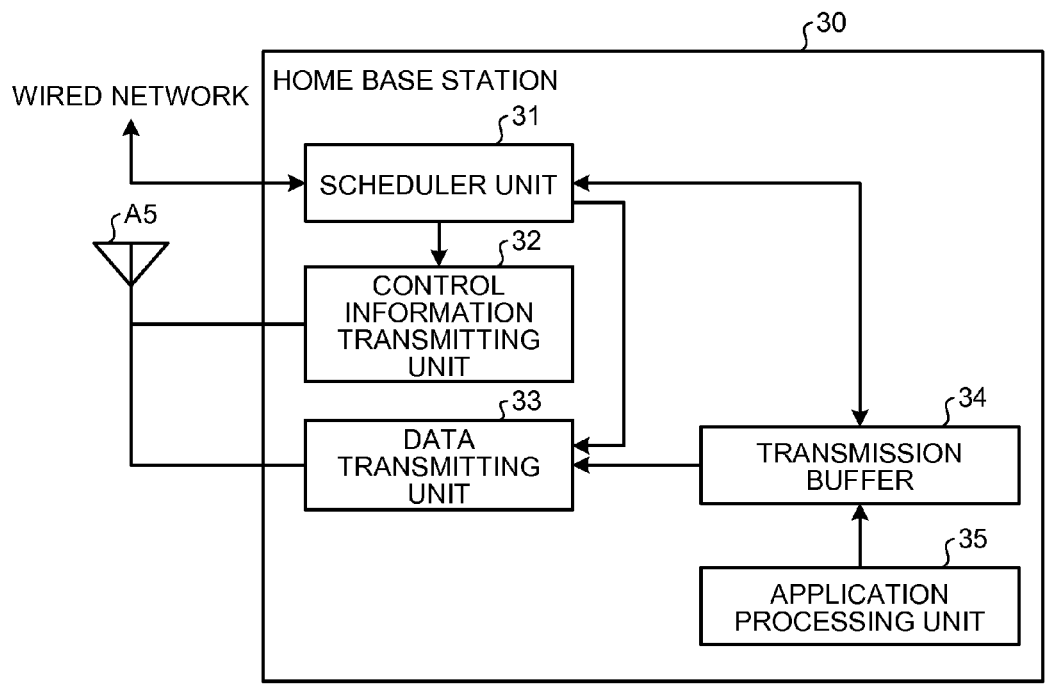
FIG. 4 is a diagram illustrating a functional configuration of a home base station according to the first embodiment.

FIG. 4 is a diagram illustrating a functional configuration of the home base station according to the first embodiment. The home base station 30 includes a scheduler unit 31, a control information transmitting unit 32, a data transmitting unit 33, a transmission buffer 34, and a application processing unit 35. All of the components are connected to one another such that signals and data can be input and output unidirectionally or bidirectionally.

When receiving the control information transmission request from the macro base station 20 via a wired network, the scheduler unit 31 instructs the control information transmitting unit 32 to transmit the control information on the home base station 30. The control information transmitting unit 32 transmits the control information on the home base station 30 to the macro base station 20 via an antenna A5 in accordance with an instruction from the scheduler unit 31. The data transmitting unit 33 transmits transmission target data via the antenna A5 in accordance with an instruction input by the scheduler unit 31. The transmission buffer 34 sends the transmission target data to the data transmitting unit 33 based on an instruction from the scheduler unit 31. The application processing unit 35 outputs, to the transmission buffer 34, the transmission target data processed by a predetermined application.

Figure 5:
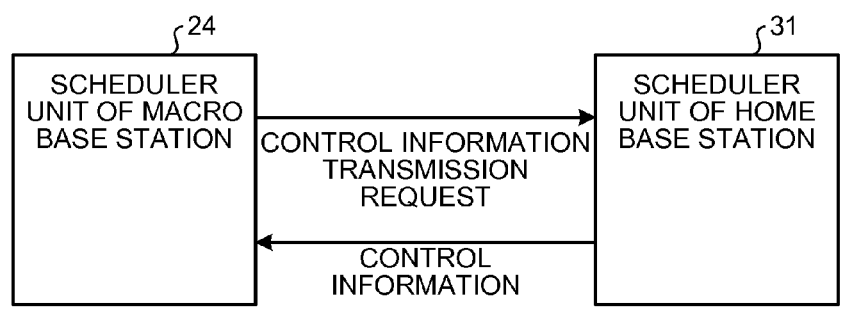
FIG. 5 is a diagram illustrating how control information is transmitted and received between the macro base station and the home base station according to the first embodiment.

Meanwhile, FIG. 5 is a diagram illustrating how the control information is transmitted and received between the macro base station and the home base station according to the first embodiment. As illustrated in FIG. 5, when the scheduler unit 24 of the macro base station 20 requests the home base station 30 to transmit the control information, the home base station 30 sends the control information to the macro base station 20 as a response. Specifically, the macro base station 20 notifies, by the control information transmission request, the home base station 30 of a timing at which the macro base station 20 transmits data to the mobile station 10. The scheduler unit 31 of the home base station 30 transmits the control information obtained at the timing, that is, the control information on data to be transmitted to the mobile station communicating with the home base station 30, to the macro base station 20 as a response. Therefore, the mobile station 10 can specify data that needs to be removed (need not be acquired) based on the control information on the home base station 30 when receiving data from the macro base station 20 at the above timing.

Figure 6:
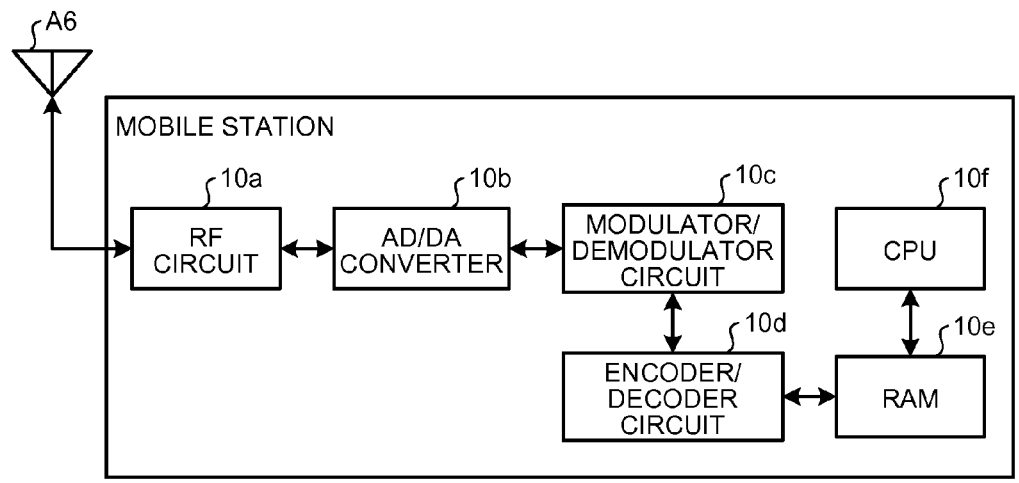
FIG. 6 is a diagram illustrating a hardware configuration of the mobile station.

Next, hardware configurations of the mobile station 10, the macro base station 20, and the home base station 30 will be explained below. FIG. 6 is a diagram illustrating a hardware configuration of the mobile station 10. As illustrated in FIG. 6, in the mobile station 10, an RF (Radio Frequency) circuit 10a, an AD (Analog to Digital)/DA (Digital to Analog) converter 10b, a modulator/demodulator circuit 10c, an encoder/decoder circuit 10d, a RAM (Random Access Memory) 10e, and a CPU (Central Processing Unit) 10f are connected to one another via a bus so that various signals and data can be input and output. The SIC function notifying unit 11 and the control information receiving unit 12 of the mobile station 10 are physically implemented by, for example, the RF circuit 10a. The control information analyzing unit 13, the subtracting unit 144, and the application processing unit 147 of the mobile station 10 are physically implemented by, for example, the CPU 10f. The home base station demodulating unit 141 and the macro base station demodulating unit 145 of the mobile station 10 are physically implemented by, for example, the modulator/demodulator circuit 10c. The home base station decoding unit 142, the macro base station decoding unit 146, and the re-encoding unit 143 of the mobile station 10 are physically implemented by, for example, the encoder/decoder circuit 10d.

Figure 7:
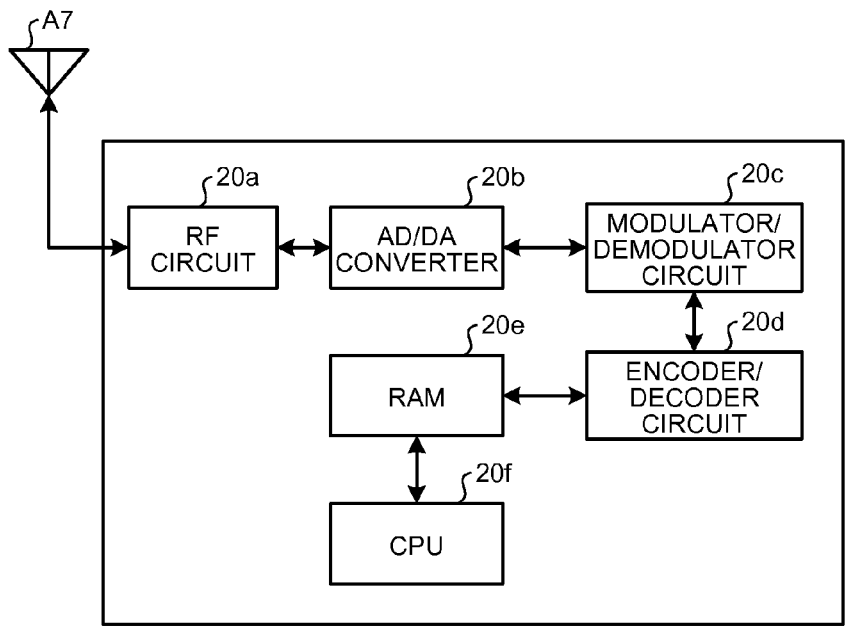
FIG. 7 is a diagram illustrating a hardware configuration of the macro base station and the home base station.

FIG. 7 is a diagram illustrating a hardware configuration of the macro base station and the home base station. As illustrated in FIG. 7, in the macro base station 20, an RF circuit 20a, an AD/DA converter 20b, a modulator/demodulator circuit 20c, an encoder/decoder circuit 20d, a RAM 20e, and a CPU 20f are connected to one another via a bus so that various signals and data can be input and output. The SIC function receiving unit 21, the control information transmitting unit 25, and the data transmitting unit 26 of the macro base station 20 are physically implemented by, for example, the RF circuit 20a. The home base station detecting unit 22, the cooperative scheduling determining unit 23, the scheduler unit 24, and the application processing unit 28 of the macro base station 20 are physically implemented by, for example, the CPU 20f. The transmission buffer 27 of the macro base station 20 is physically implemented by, for example, the RAM 20e.

The home base station 30 has the same physical configuration as that of the macro base station 20 as described above. Namely, in the home base station 30, as illustrated in FIG. 7, the RF circuit 20a, the AD/DA converter 20b, the modulator/demodulator circuit 20c, the encoder/decoder circuit 20d, the RAM 20e, and the CPU 20f are connected to one another via a bus so that various signals and data can be input and output. The scheduler unit 31 and the application processing unit 35 of the home base station 30 are physically implemented by, for example, the CPU 20f. The control information transmitting unit 32 and the data transmitting unit 33 of the home base station 30 are physically implemented by, for example, the RF circuit 20a. The transmission buffer 34 of the home base station 30 is physically implemented by, for example, the RAM 20e.

Operation of the wireless communication system according to the first embodiment will be explained below.

FIG. 8 is a diagram illustrating the operation of the wireless communication system according to the first embodiment. In the first embodiment, the macro base station 20 and the home base station 30 transmit and receive control information by using a wired line. At S1, the mobile station 10 sends a notice of whether the mobile station 10 has the SIC function to the macro base station 20. The macro base station 20 determines whether the mobile station 10 has the SIC function based on the received notice. When the mobile station 10 has the SIC function, the macro base station 20 is caused to detect a home base station located near the mobile station based on neighboring-cell measurement information notified by the mobile station 10 (S2).

When the macro base station 20 detects the home base station 30 near the mobile station 10, because there is a possibility that an interference may occur at the time of data transmission, the macro base station 20 requests the home base station 30 to transmit control information according to the method illustrated in FIG. 5 (S3), and receives the control information from the home base station 30 (S4). The macro base station 20 transmits the control information on the macro base station 20 and the control information received from the home base station 30 at S4 to the mobile station 10 (S5). Subsequently, the macro base station 20 transmits data addressed to the mobile station 10 based on the control information on the data transmission from the macro base station 20 to the mobile station 10 (S6). At the same time, along with the data transmission, the home base station 30 interferes with the mobile station 10 due to data addressed to other mobile stations (S7). However, the mobile station 10 cancels the data addressed to the other mobile stations by the SIC function and thereafter acquires the data addressed to the mobile station 10 (S8).

Detailed operation of the wireless communication system 1 will be explained below with reference to FIG. 9 to FIG. 11.

FIG. 9 is a flowchart illustrating the operation of the mobile station according to the first embodiment. The mobile station 10 monitors whether the SIC function is provided (S11). When the mobile station 10 is provided with the SIC function (YES at S11), the mobile station 10 notifies the macro base station 20 that the mobile station 10 is provided with the SIC function (S12). At S13, the mobile station 10 receives, from the macro base station 20, the control information on the macro base station 20 and the control information on the home base station 30. At S14, the mobile station 10 demodulates and decodes data received from the home base station 30. The mobile station 10 re-encodes the decoded data and thereafter cancels the re-encoded data from the received data (S15). The mobile station 10 performs a decoding and demodulating process on a signal of the macro base station 20, where the signal is data in which a signal of the home base station 30 is cancelled (S16).

Meanwhile, at S11, when it is determined that the mobile station 10 is not provided with the SIC function (NO at S11), the mobile station 10 performs normal processing. Namely, the mobile station 10 receives the control information from the macro base station 20 (S17), and performs a decoding and demodulating process on the signal of the macro base station 20, where the signal is the received data (S18).

FIG. 10 is a flowchart illustrating the operation of the macro base station according to the first embodiment. The macro base station 20 monitors whether a notice indicating presence of the SIC function is received (S21). When receiving the notice indicating presence of the SIC function from the mobile station 10 (YES at S21), the macro base station 20 requests the home base station 30 to transmit the control information (S22). At S23, the macro base station 20 receives the control information from the home base station 30. Subsequently, the macro base station 20 transmits the control information received from the home base station 30 at S23 and the control information on the macro base station 20 to the mobile station 10 that has sent the notice of the SIC function (S24). The macro base station 20 transmits data to the mobile station 10 based on the control information on the macro base station 20 transmitted at S24 (S25).

At S21, when the macro base station 20 does not receive the notice indicating presence of the SIC function from the mobile station 10 (NO at S21), the macro base station 20 performs normal processing. Namely, the macro base station 20 transmits the control information on the macro base station 20 to the mobile station 10 (S26), and thereafter transmits data based on the control information to the mobile station 10 (S27).

FIG. 11 is a flowchart illustrating the operation of the home base station according to the first embodiment. The home base station 30 monitors whether the control information transmission request is received from the macro base station 20 (S31). When receiving the control information transmission request from the macro base station 20 (YES at S31), the home base station 30 transmits the control information to the macro base station 20 in response to the request (S32). Subsequently, the home base station 30 transmits the control information to a mobile station that is registered in the home base station 30 (S33), and transmits data based on the control information to the mobile station (S34).

At S31, when the home base station 30 does not receive the control information transmission request from the macro base station 20 (NO at S31), the home base station 30 performs the same processes as those at S33 and S34. Specifically, the home base station 30 transmits the control information to a mobile station that is registered in the home base station 30 (S35), and transmits data based on the control information to the mobile station (S36).

As described above, the wireless communication system 1 includes the mobile station 10, the macro base station 20, and the home base station 30. The mobile station 10 receives a wireless signal containing the transmission signal of the macro base station 20 and the transmission signal of the home base station 30. The mobile station 10 includes the control information receiving unit 12 and the reception processing unit 14. The control information receiving unit 12 receives control information used for a process of receiving a transmission signal of the macro base station 20 and receives control information used for a process of receiving a transmission signal of the home base station 30. The reception processing unit 14 demodulates and decodes a signal based on the control information on the macro base station 20, where the signal is obtained by reducing a component of the transmission signal of the home base station 30 from the wireless signal by using information that is obtained by demodulating and decoding the transmission signal of the home base station 30 based on the control information. The mobile station 10 further includes the SIC function notifying unit 11 that transmits information indicating that the mobile station 10 has the interference reduction function to the macro base station 20. Alternatively, the mobile station 10 may further include the SIC function notifying unit 11 that transmits information indicating a type of a receiving circuit of the mobile station 10 to the macro base station 20.

According to the wireless communication system 1 with the above configuration, the mobile station 10 notifies the macro base station 20 that the mobile station 10 has the SIC function, and the macro base station 20 transmits the control information on the home base station 30 as well as the control information on the macro base station 20 to the mobile station 10 connected to the macro base station 20. The mobile station 10 first subtracts data, which is obtained by demodulating, decoding, and re-encoding the signal of the home base station 30, from an original signal by using the pieces of the control information, and thereafter receives a signal from the macro base station 20. Namely, the mobile station 10 demodulates and decodes data received from the home base station 30 so as to cancel the interference by the home base station 30. For this purpose, pieces of information, such as frequency resource to which the data is allocated, a modulation method applied to the data, and the bit number of the data, are needed. Therefore, the mobile station 10 acquires these pieces of information, as the control information, from the macro base station 20. Accordingly, the mobile station 10 can cancel a signal received from the home base station 30 and can ensure the same data reception characteristics as in the case where interference does not occur.

Furthermore, according to the wireless communication system 1, the interference is cancelled by the mobile station 10 connected to the macro base station 20. Therefore, the home base station 30 need not take other countermeasures, such as limitation on transmission power or resource allocation, in order to cancel the interference. Namely, the home base station 30 can transmit data to a mobile station of the home base station 30 without concern for the interference with a mobile station, such as the mobile station 10, of the macro base station 20. Therefore, it is possible to reduce concern that the throughput of the home base station 30 may be reduced due to the limitation as described above.

Second Embodiment

Next, a second embodiment will be explained. A configuration of a wireless communication system according to the second embodiment is the same as the configuration of the wireless communication system 1 according to the first embodiment illustrated in FIG. 1. In addition, configurations of a base station and a mobile station according to the second embodiment are the same as the configurations of the base station and the mobile station according to the first embodiment illustrated in FIG. 2 to FIG. 4. Therefore, in the second embodiment, detailed explanation of the configurations will be omitted. The second embodiment differs from the first embodiment in that the home base station transmits the control information to the mobile station. Specifically, in the first embodiment, the home base station first transmits the control information to the macro base station and thereafter the macro base station that has received the control information transmits the control information to the mobile station. In contrast, in the second embodiment, the home base station directly transmits the control information to the mobile station without via the macro base station. In the following, the configurations and operation of the base station and the mobile station according to the second embodiment will be explained with reference to FIG. 12 to FIG. 18 with a focus on the difference from the first embodiment.

Figure 12:
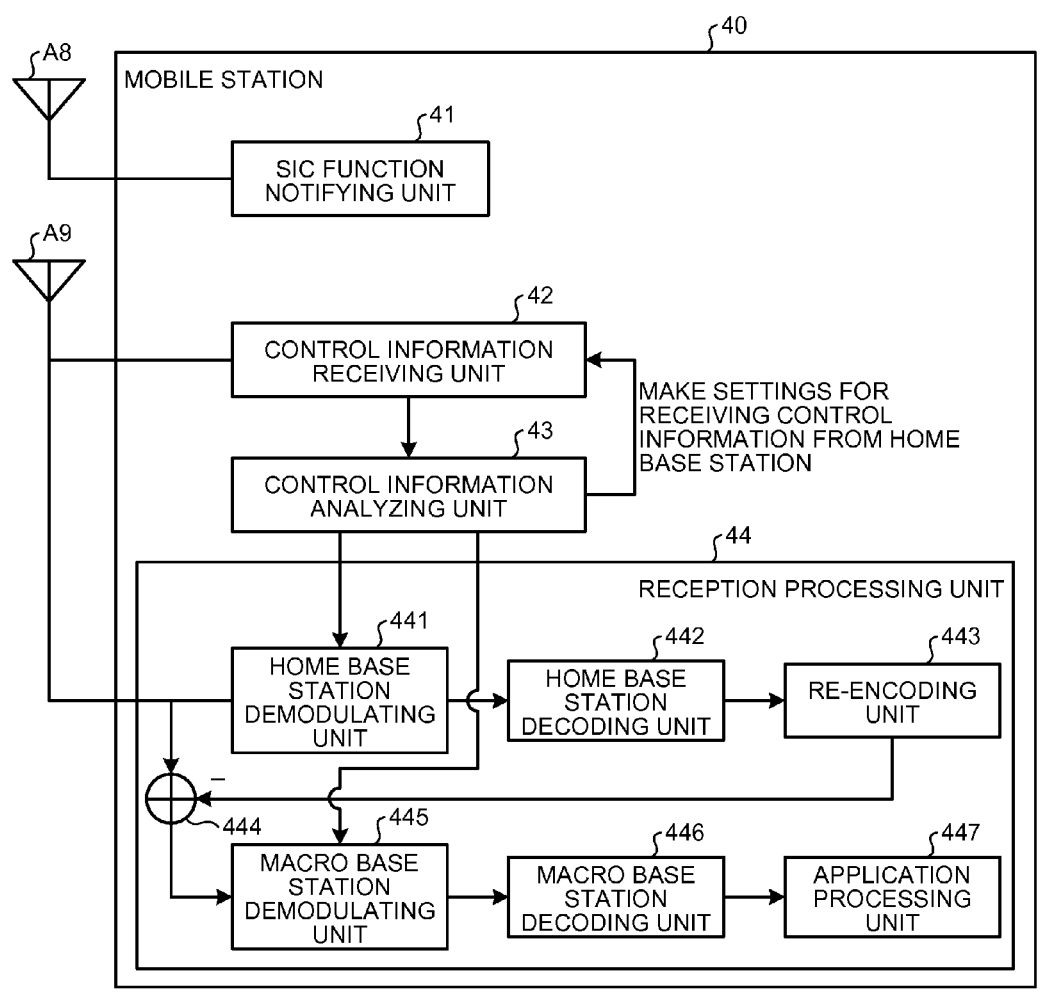
FIG. 12 is a diagram illustrating a functional configuration of a mobile station according to second and third embodiments.

FIG. 12 is a diagram illustrating a functional configuration of the mobile station according to the second embodiment. As illustrated in FIG. 12, a mobile station 40 has the same configuration as the mobile station 10 according to the first embodiment except for a control information receiving unit 42 and a control information analyzing unit 43. Therefore, the same components are denoted by reference numerals with the same last numbers, and detailed explanation thereof will be omitted. Specifically, an SIC function notifying unit 41, the control information receiving unit 42, the control information analyzing unit 43, and a reception processing unit 44 of the second embodiment are components corresponding to the SIC function notifying unit 11, the control information receiving unit 12, the control information analyzing unit 13, and the reception processing unit 14 of the first embodiment, respectively. Furthermore, a home base station demodulating unit 441, a home base station decoding unit 442, a re-encoding unit 443, and a subtracting unit 444 of the second embodiment correspond to the home base station demodulating unit 141, the home base station decoding unit 142, the re-encoding unit 143, and the subtracting unit 144 of the first embodiment, respectively. Moreover, a macro base station demodulating unit 445, a macro base station decoding unit 446, and an application processing unit 447 of the second embodiment correspond to the macro base station demodulating unit 145, the macro base station decoding unit 146, and the application processing unit 147 of the first embodiment, respectively.

The control information receiving unit 42 and the control information analyzing unit 43 that differ from the first embodiment will be explained below. The control information receiving unit 42 can handle reception of the control information from the home base station 30 as well as reception of the control information from the macro base station 20. Namely, the control information analyzing unit 43 receives, from the macro base station 20, setting information for receiving the control information from the home base station 30 in advance, and the control information receiving unit 42 makes settings so that the control information can be received from the home base station 30 based on the setting information.

Figure 13:
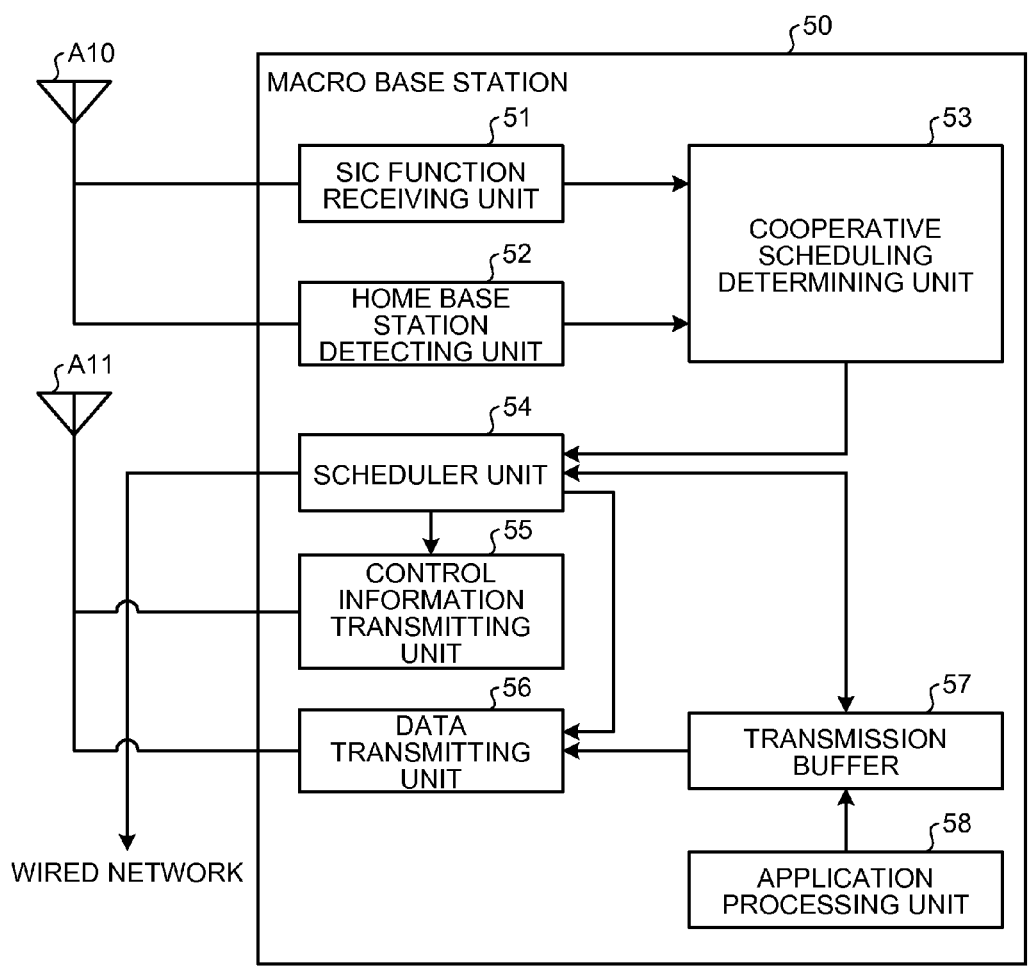
FIG. 13 is a diagram illustrating a functional configuration of a macro base station according to the second embodiment.

Next, FIG. 13 is a diagram illustrating a functional configuration of the macro base station according to the second embodiment. As illustrated in FIG. 13, a macro base station 50 has the same configuration as the macro base station 20 according to the first embodiment except for a scheduler unit 54. Therefore, the same components are denoted by reference numerals with the same last numbers, and detailed explanation thereof will be omitted. Specifically, an SIC function receiving unit 51, a home base station detecting unit 52, a cooperative scheduling determining unit 53, and the scheduler unit 54 of the second embodiment are components corresponding to the SIC function receiving unit 21, the home base station detecting unit 22, the cooperative scheduling determining unit 23, and the scheduler unit 24 of the first embodiment, respectively. Furthermore, a control information transmitting unit 55, a data transmitting unit 56, a transmission buffer 57, and an application processing unit 58 of the second embodiment are components corresponding to the control information transmitting unit 25, the data transmitting unit 26, the transmission buffer 27, and the application processing unit 28, respectively.

The scheduler unit 54 that differs from the first embodiment will be explained below. The scheduler unit 54 transmits a control information transmission request to the home base station 30. However, in the second embodiment, because the control information is directly transmitted from the home base station 30 to the mobile station 10, the scheduler unit 54 does not receive the control information from the home base station 30.

Figure 14:
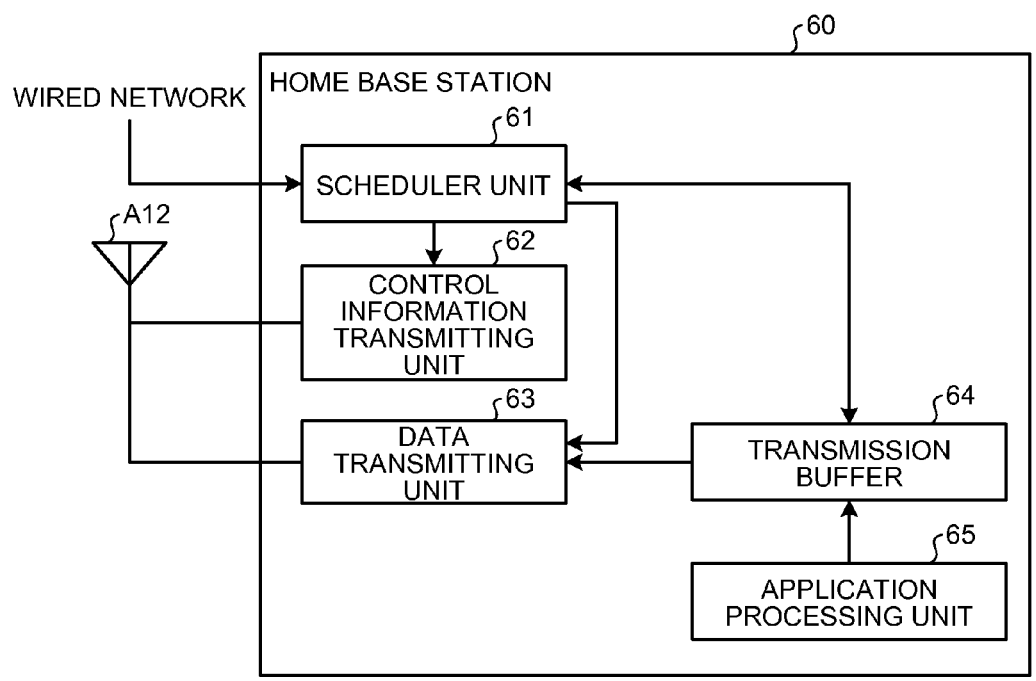
FIG. 14 is a diagram illustrating a functional configuration of a home base station according to the second embodiment.

FIG. 14 is a diagram illustrating a functional configuration of the home base station according to the second embodiment. As illustrated in FIG. 14, a home base station 60 has the same configuration as the home base station 30 according to the first embodiment except for a control information transmitting unit 62. Therefore, the same components are denoted by reference numerals with the same last numbers, and detailed explanation thereof will be omitted. Specifically, a scheduler unit 61, the control information transmitting unit 62, and a data transmitting unit 63 of the second embodiment are components corresponding to the scheduler unit 31, the control information transmitting unit 32, and the data transmitting unit 33 of the first embodiment, respectively. Furthermore, a transmission buffer 64 and an application processing unit 65 of the second embodiment correspond to the transmission buffer 34 and the application processing unit 35 of the first embodiment, respectively. The control information transmitting unit 62 that differs from the first embodiment transmits the control information to the mobile station 40 via an antenna A12.

Hardware configurations of the mobile station 40, the macro base station 50, and the home base station 60 of the second embodiment are the same as the hardware configurations of the mobile station 10, the macro base station 20, and the home base station 30 of the first embodiment, respectively.

Figure 15:
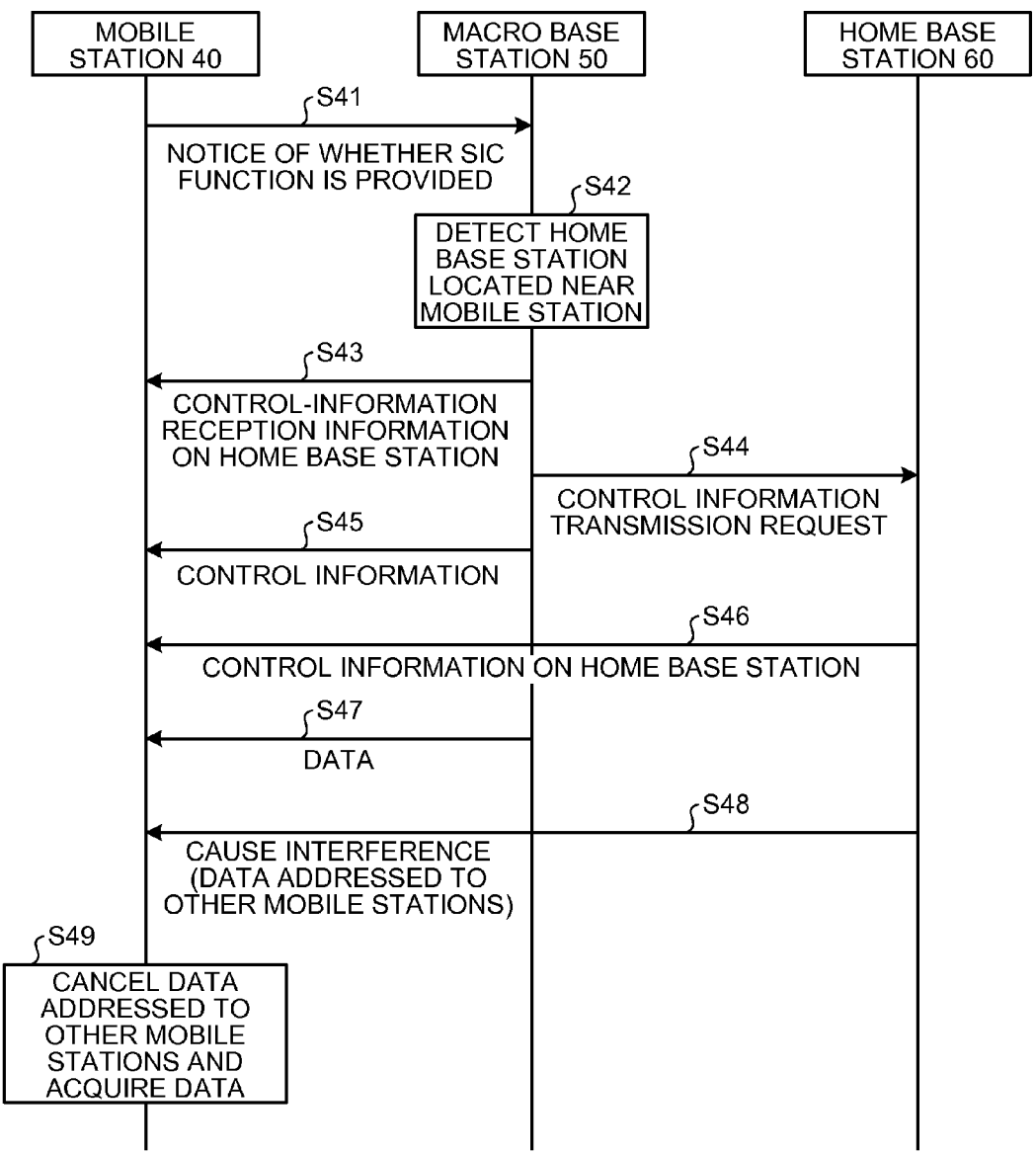
FIG. 15 is a diagram illustrating operation of a wireless communication system according to the second embodiment.

FIG. 15 is a diagram illustrating operation of the wireless communication system according to the second embodiment. As illustrated in FIG. 15, the operation of the wireless communication system according to the second embodiment is the same as the operation of the wireless communication system described in detail in the first embodiment except for the processes from S43 to S46. Therefore, detailed explanation of the same operation will be omitted. Specifically, the processes at Steps S41, S42, and S47 to S49 of the second embodiment correspond to the processes at Steps S1, S2, and S6 to S8 of the first embodiment, respectively.

The processes at S43 to S46 that differ from the first embodiment will be explained below. At Step S43, the macro base station 50 transmits control-information reception information on the home base station 60 to the mobile station 40. The control-information reception information is setting information for enabling the mobile station 40 to receive the control information from the home base station 60 in addition to the control information from the macro base station 50. The mobile station 40 is enabled to receive the control information from the home base station 60 based on the setting information. The setting information includes, for example, an MCS (Modulation and Coding Scheme) unique to the transmission signal from the home base station 60, a scrambling code, and an ID of the home base station 60 for identifying a base station for which interference is to be cancelled. The setting information includes, for example, a channel format for transmitting the control information on the home base station 60 and information on the location of the control information in the channel.

When the pre-setting for receiving the control information is completed at S43, the macro base station 50 requests the home base station 60 to transmit the control information to the mobile station 40 (S44). The macro base station 50 transmits the control information on the macro base station 50 to the mobile station 40 upon completion of issuance of the transmission request to the home base station 60 (S45). The home base station 60 transmits the control information on the home base station 60 to the mobile station 40 in response to the control information transmission request issued at S44 (S46).

Figure 16:
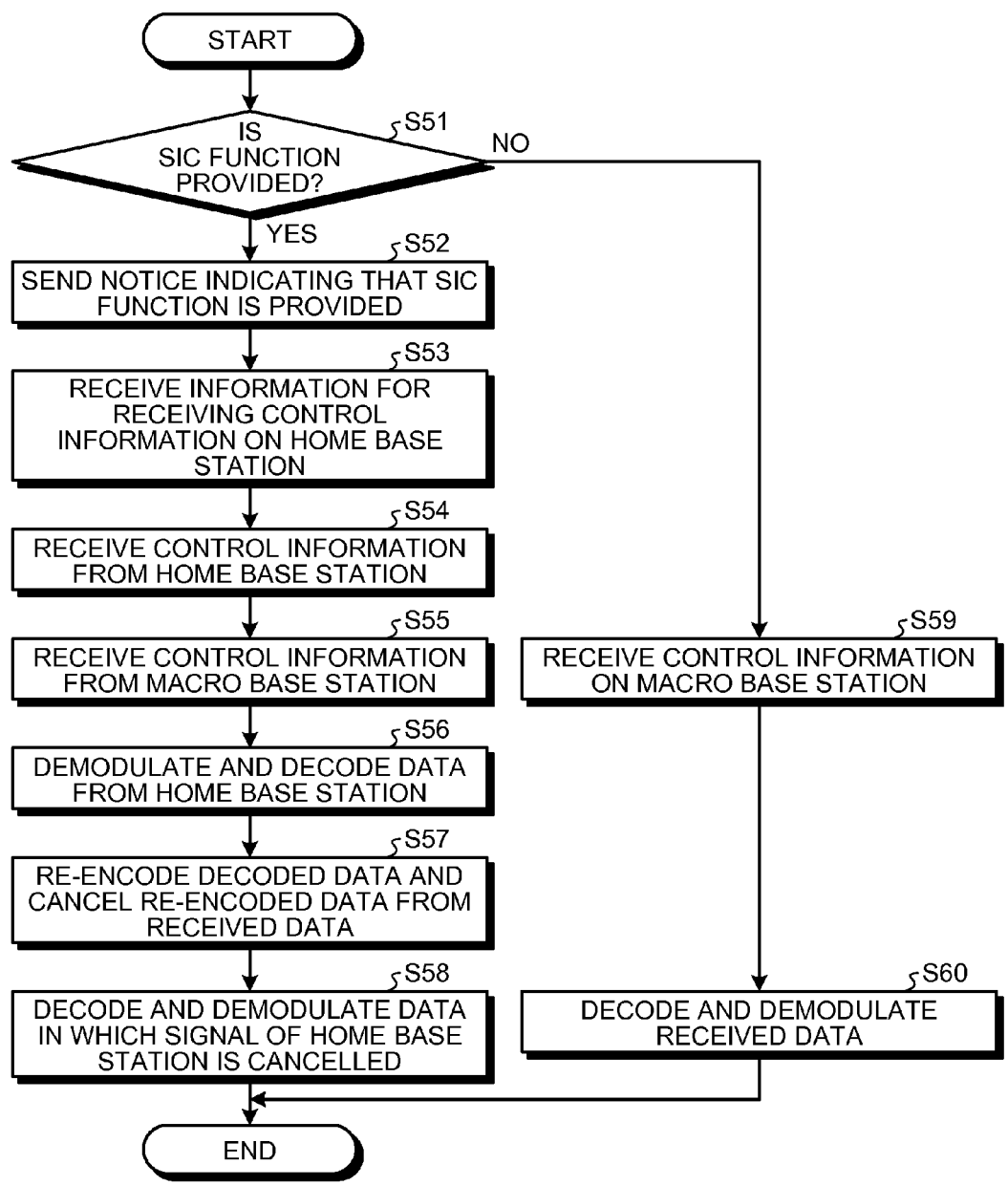
FIG. 16 is a flowchart illustrating operation of the mobile station according to the second and third embodiments.

FIG. 16 is a flowchart illustrating the operation of the mobile station 40 according to the second embodiment. As illustrated in FIG. 16, the operation of the mobile station 40 according to the second embodiment is the same as the operation of the mobile station 10 according to the first embodiment except for the processes at S53 and S54. Therefore, detailed explanation of the same operation will be omitted. Specifically, the processes at Steps S51, S52, and S55 to S60 of the second embodiment correspond to the processes at Steps S11 to S18 of the first embodiment, respectively. At Steps S53 and S54 that differ from the first embodiment, the mobile station 40 receives the setting information from the macro base station 50 (S53), and receives the control information from the home base station 60 based on the setting information (S54).

Figure 17:
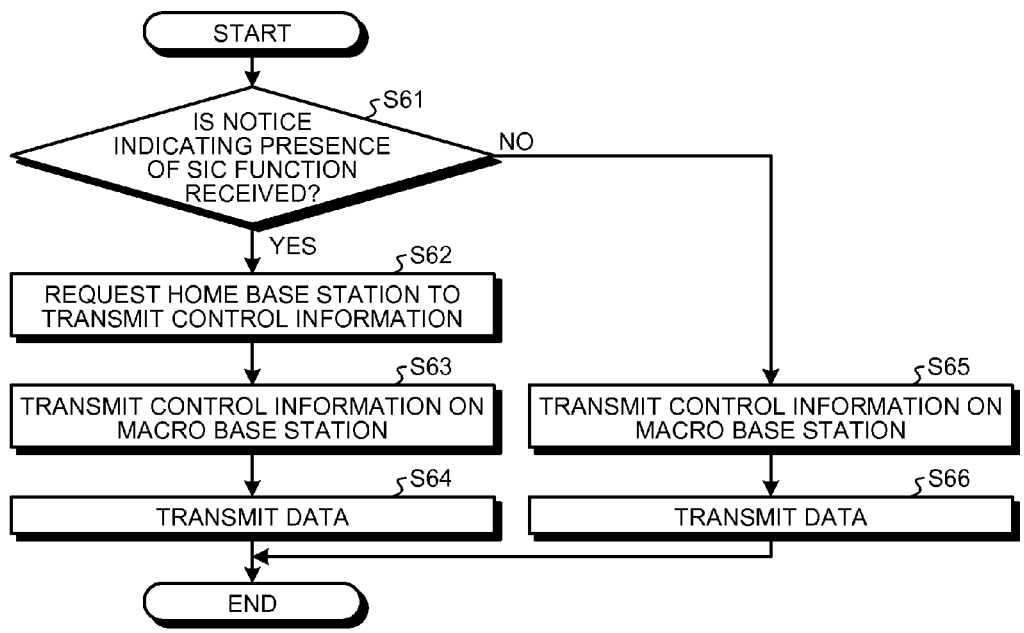
FIG. 17 is a flowchart illustrating operation of the macro base station according to the second embodiment.

FIG. 17 is a flowchart illustrating the operation of the macro base station 50 according to the second embodiment. As illustrated in FIG. 17, the operation of the macro base station 50 according to the second embodiment is the same as the operation of the macro base station 20 according to the first embodiment except for the process at S63. Therefore, detailed explanation of the same operation will be omitted. Specifically, the processes at Steps S61, S62, and S64 to S66 of the second embodiment correspond to the processes at Steps S21, S22, and S25 to S27 of the first embodiment, respectively. At Step S63 that differs from the first embodiment, the macro base station 50 transmits the control information on the macro base station 50 to the mobile station 40 without receiving the control information from the home base station 60.

Figure 18:
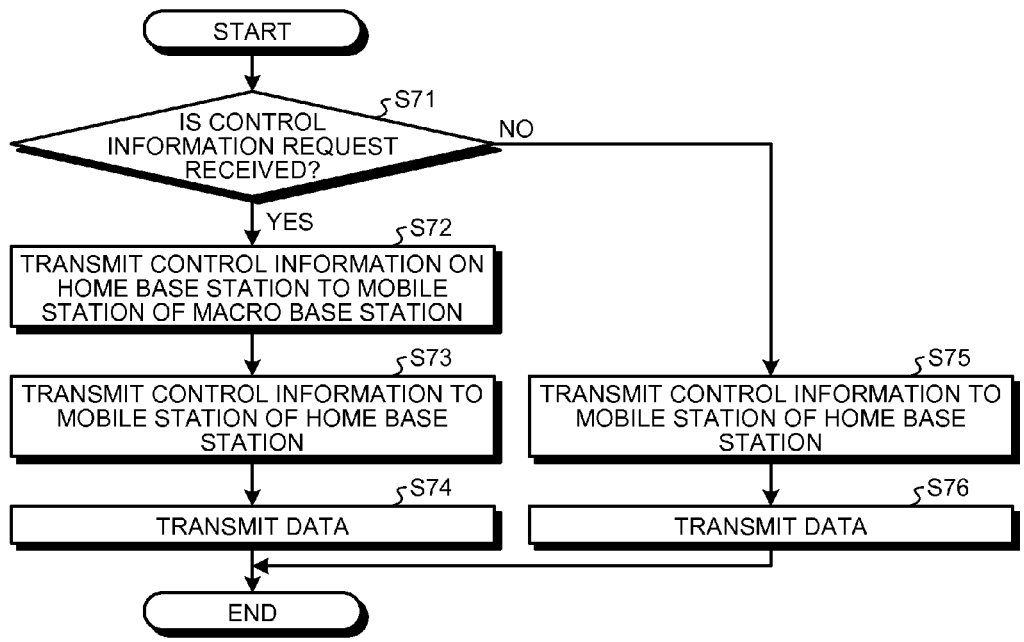
FIG. 18 is a flowchart illustrating operation of the home base station according to the second embodiment.

FIG. 18 is a flowchart illustrating the operation of the home base station 60 according to the second embodiment. As illustrated in FIG. 18, the operation of the home base station 60 according to the second embodiment is the same as the operation of the home base station 30 according to the first embodiment except for the process at S72. Therefore, the same processes are denoted by Step numbers with the same last numbers, and detailed explanation thereof will be omitted. Specifically, the processes at Steps S71 and S73 to S76 of the second embodiment correspond to the processes at Steps S31 and S33 to S36 of the first embodiment, respectively. At Step S72 that differs from the first embodiment, the home base station 60 receives a request from the macro base station 50, and transmits the control information on the home base station 60 to the mobile station 40 of the macro base station 50. The control information on the home base station 60 is directly transmitted from the home base station 60 to the mobile station 40 without via the macro base station 50.

As described above, according to the wireless communication system of the second embodiment, the home base station 60 transmits the control information to the mobile station 40 in response to a request from the macro base station 50. Namely, when performing scheduling (data transmission control) on the mobile station 40 located in the vicinity of the home base station 60, the macro base station 50 transmits the control information transmission request to the home base station 60 to notify the home base station 60 of a timing at which data is transmitted by the macro base station 50. When receiving the control information transmission request, the home base station 60 wirelessly transmits the control information on the home base station 60 to the mobile station 40 before the timing scheduled by the macro base station 50. The mobile station 40 cancels data of the home base station 60 from the data of the macro base station 50 by using the control information, so that the mobile station 40 can receive data intended to be received by the mobile station 40 without being influenced by interference.

In the second embodiment, the mobile station 40 is not enabled to connect to the home base station 60. However, the mobile station 40 receives, from the home base station 60, only the control information to be used to demodulate and decode the transmission signal of the home base station 60. Because the mobile station 40 receives only the control information from the home base station 60, the mobile station 40 does not use the Internet line of an owner of the home base station 60. Therefore, the mobile station 40 can hardly be connected to a network extended from the home base station 60, so that data leakage can be prevented. Specifically, the wireless communication system can improve the reception characteristics of data transmitted by the macro base station 50 while maintaining the user exclusivity in the home base station 60 and the data confidentiality in the mobile station 40. In the second embodiment, the home base station 60 transmits the control information to the mobile station 40 that is a mobile station other than mobile stations registered in the home base station 60. Therefore, the home base station 60 need not take other countermeasures, such as limitation on transmission power or limitation on resource allocation, in order to cancel the interference. Therefore, the wireless communication system according to the second embodiment is preferable for a user of the home base station 60.

Third Embodiment

A third embodiment will be explained below. A configuration of a wireless communication system according to the third embodiment is the same as the configuration of the wireless communication system 1 according to the first embodiment illustrated in FIG. 1. In addition, configurations of a base station and a mobile station according to the third embodiment are the same as the configurations of the base station and the mobile station according to the second embodiment illustrated in FIG. 12 to FIG. 14. Therefore, in the third embodiment, detailed explanation of the configurations will be omitted. The third embodiment differs from the second embodiment in that the macro base station wirelessly sends a control information transmission request. Specifically, in the second embodiment, the macro base station transmits the control information transmission request to the home base station via the wired line. In contrast, in the third embodiment, the macro base station transmits the control information transmission request via a wireless channel. In the following, the configurations and operation of the base station and the mobile station according to the third embodiment will be explained with reference to FIG. 19 to FIG. 22 with a focus on the difference from the second embodiment.

Figure 19:
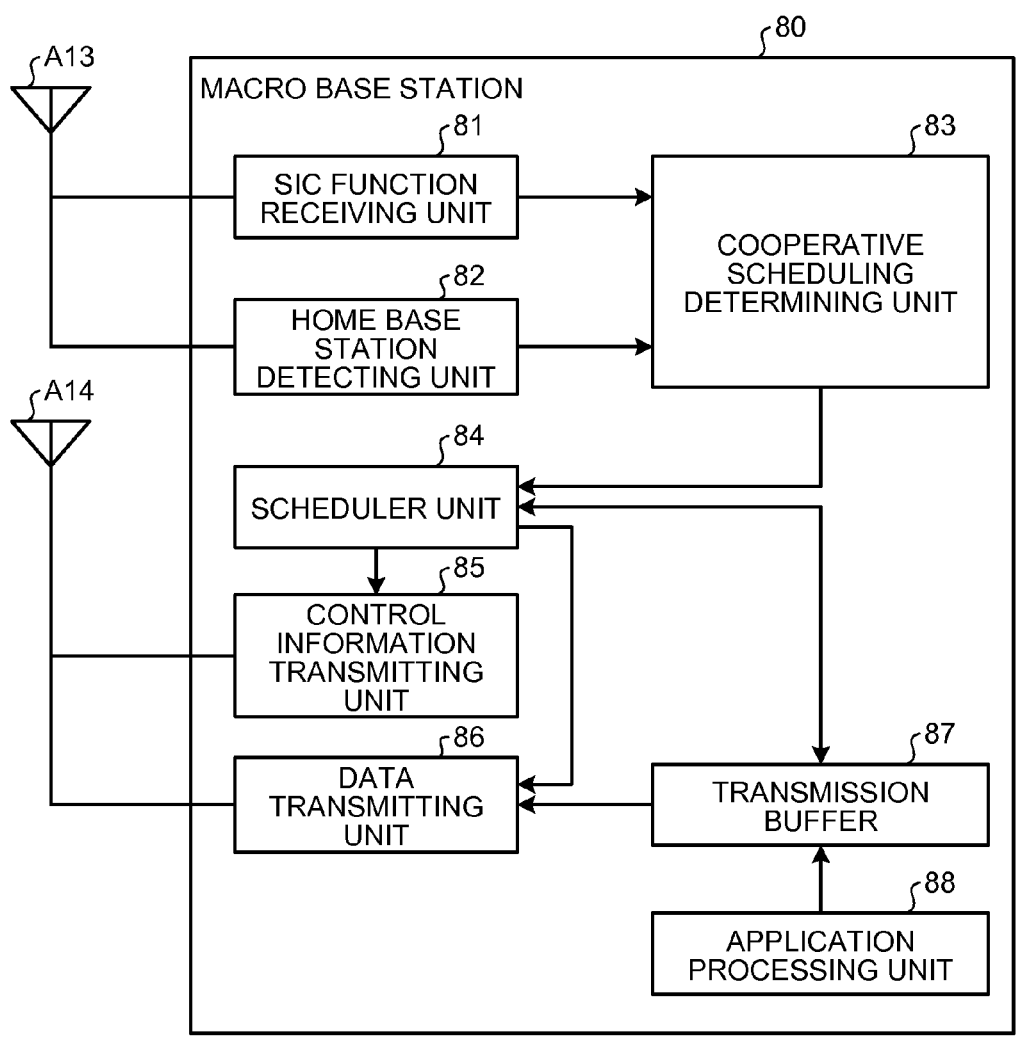
FIG. 19 is a diagram illustrating a functional configuration of a macro base station according to the third embodiment.

The configuration and the operation of the mobile station of the third embodiment are the same as the configuration and the operation of the mobile station of the second embodiment; therefore drawings and descriptions thereof will be omitted. FIG. 19 is a diagram illustrating a functional configuration of the macro base station according to the third embodiment. As illustrated in FIG. 19, a macro base station 80 has the same configuration as the macro base station 50 according to the second embodiment except for a control information transmitting unit 85. Therefore, the same components are denoted by reference numerals with the same last numbers, and detailed explanation thereof will be omitted. Specifically, an SIC function receiving unit 81, a home base station detecting unit 82, a cooperative scheduling determining unit 83, and a scheduler unit 84 of the third embodiment are components corresponding to the SIC function receiving unit 51, the home base station detecting unit 52, the cooperative scheduling determining unit 53, the scheduler unit 54 of the second embodiment, respectively. Furthermore, the control information transmitting unit 85, a data transmitting unit 86, a transmission buffer 87, and an application processing unit 88 of the third embodiment are components corresponding to the control information transmitting unit 55, the data transmitting unit 56, the transmission buffer 57, and the application processing unit 58, respectively. The control information transmitting unit 85 that differs from the first embodiment transmits the control information transmission request to a home base station 90 via an antenna A14.

Figure 20:
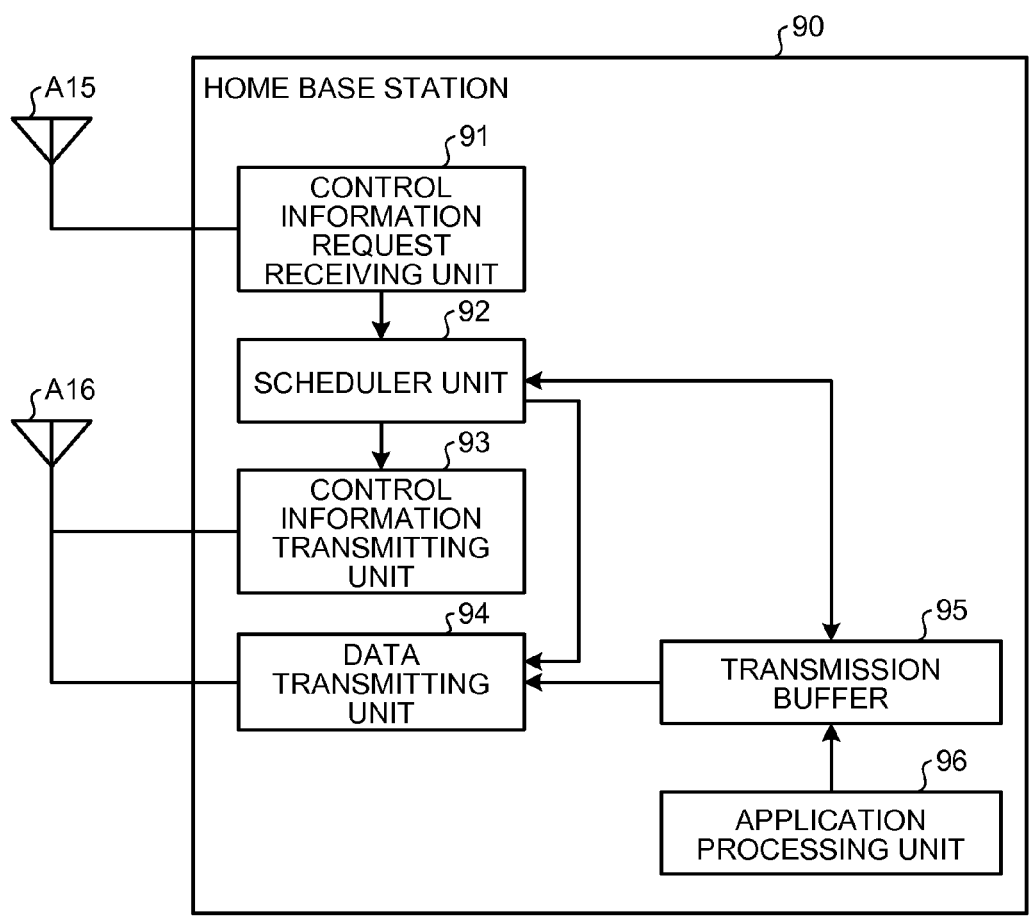
FIG. 20 is a diagram illustrating a functional configuration of a home base station according to the third embodiment.

FIG. 20 is a diagram illustrating a functional configuration of the home base station according to the third embodiment. As illustrated in FIG. 20, the home base station 90 has the same configuration as the home base station 60 according to the second embodiment except that the home base station 90 further includes a control information request receiving unit 91. Therefore, detailed explanation of the home base station 90 will be omitted. Specifically, a scheduler unit 92, a control information transmitting unit 93, a data transmitting unit 94 of the third embodiment are components corresponding to the scheduler unit 61, the control information transmitting unit 62, and the data transmitting unit 63 of the second embodiment, respectively. Furthermore, a transmission buffer 95 and an application processing unit 96 of the third embodiment correspond to the transmission buffer 64 and the application processing unit 65 of the second embodiment, respectively.

The control information request receiving unit 91 that differs from the second embodiment receives the control information transmission request addressed to the home base station 90 via an antenna A15.

Hardware configurations of the mobile station, the macro base station 80, and the home base station 90 of the third embodiment are the same as the hardware configurations of the mobile station 10, the macro base station 20, and the home base station 30 of the first embodiment, respectively.

Figure 21:
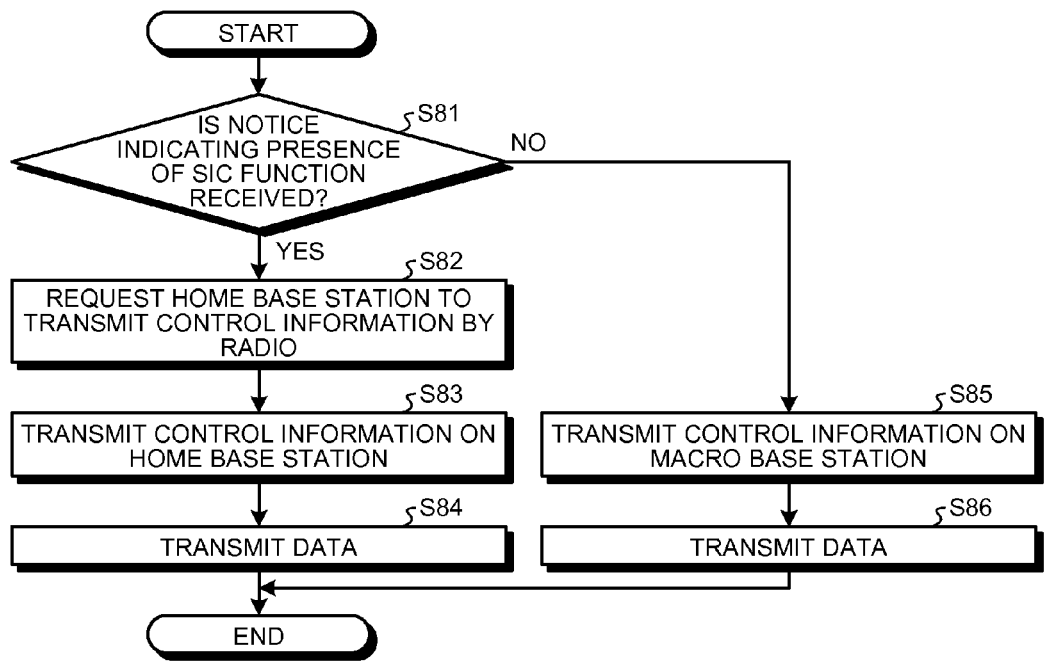
FIG. 21 is a flowchart illustrating operation of the macro base station according to the third embodiment.

FIG. 21 is a flowchart illustrating the operation of the macro base station 80 according to the third embodiment. As illustrated in FIG. 21, the operation of the macro base station 80 according to the third embodiment is the same as the operation of the macro base station 50 according to the second embodiment except for the process at S82. Therefore, the same processes are denoted by Step numbers with the same last numbers, and detailed explanation thereof will be omitted. Specifically, the processes at Steps S81 and S83 to S86 of the third embodiment correspond to the processes at Steps S61 and S63 to S66 of the second embodiment, respectively. At Step S82 that differs from the second embodiment, the macro base station 80 sends a control information transmission request to the home base station 90 via a wireless channel.

Figure 22:
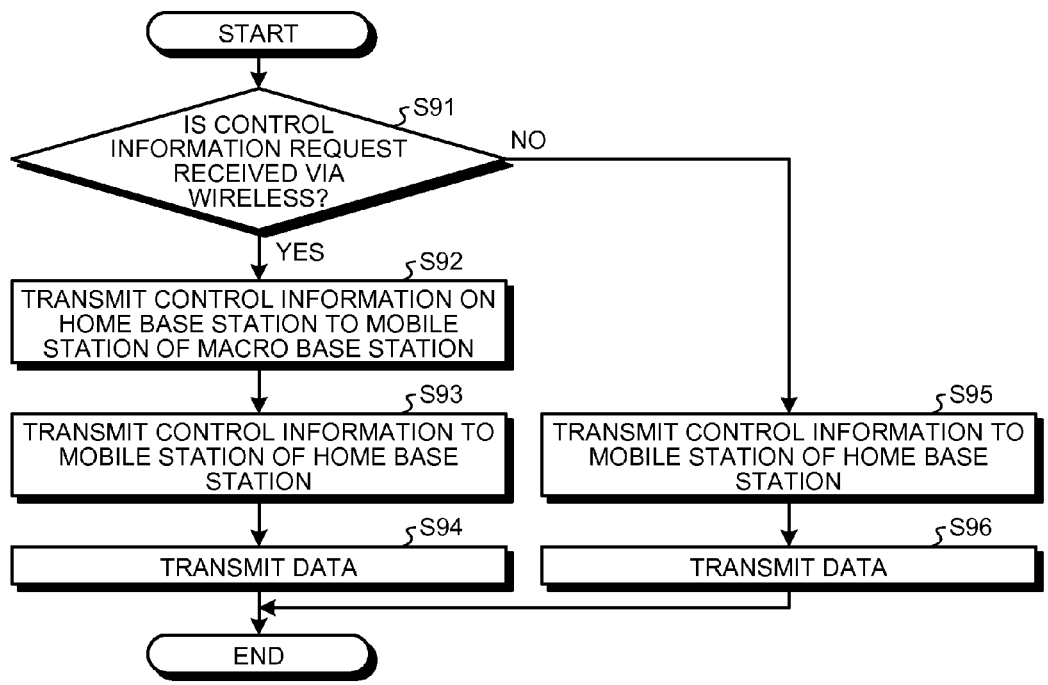
FIG. 22 is a flowchart illustrating operation of the home base station according to the third embodiment.
Figure 23:
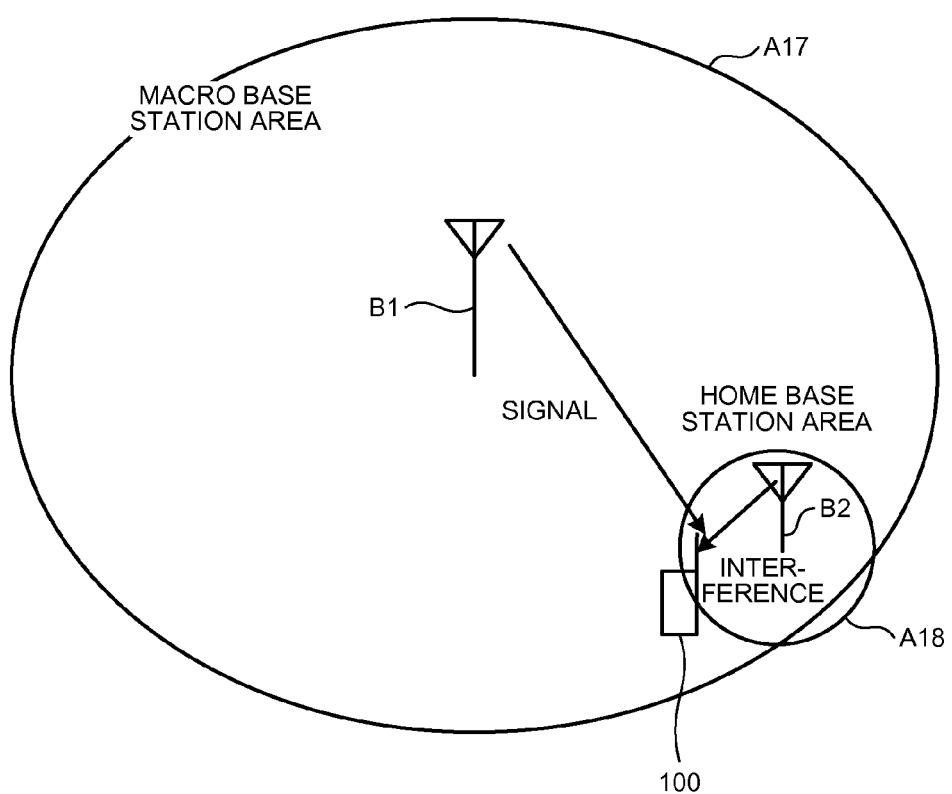
FIG. 23 is a diagram illustrating a situation where a mobile station located in an area of a macro base station is interfered with by a home base station.

FIG. 22 is a flowchart illustrating the operation of the home base station 90 according to the third embodiment. As illustrated in FIG. 22, the operation of the home base station 90 according to the third embodiment is the same as the operation of the home base station 60 according to the second embodiment except for the process at S91. Therefore, the same processes are denoted by Step numbers with the same last numbers, and detailed explanation thereof will be omitted. Specifically, the processes at Steps S92 to S96 of the third embodiment correspond to the processes at Steps S72 to S76 of the second embodiment, respectively. At Step S91 that differs from the second embodiment, the home base station 90 determines whether a control information transmission request is issued by the macro base station 80 via a wireless channel.

As described above, according to the wireless communication system of the third embodiment, the macro base station 80 sends the control information transmission request to the home base station 90 via a wireless channel. In general, a downlink receiver is mounted on the mobile station and is rarely mounted on the home base station. However, in some cases, a downlink receiver may be mounted on the home base station in order to detect whether the macro base station is located nearby, to cope with interference with the macro base station. According to the wireless communication system of the third embodiment, it is possible to easily cope with the home base station as described above, and effectively use the receiver of the home base station. Namely, the home base station can receive, by own function, the control information transmission request transmitted by downlink from the macro base station. Therefore, even when the macro base station and the home base station are not connected to each other via a wired line, the macro base station can send the control information transmission request to the home base station. Therefore, the mobile station can acquire the control information on the home base station at a predetermined timing. As a result, the versatility and the flexibility of the wireless communication system can be enhanced.

While the third embodiment described above is applied to the wireless communication system 1 based on a combination with the second embodiment, the third embodiment and the second embodiment can be applied separately. Specifically, the home base station may receive the control information transmission request from the macro base station via a wireless channel, and may transmit the control information to the macro base station in response to the request.

In each of the embodiments described above, the wireless communication system of the disclosed invention reduces interference between the macro base station and the home base station. However, the wireless communication system is not limited to this example, and may be applied as a technology for reducing interference between macro base stations. Specifically, even when a neighboring cell of the macro base station is not the home base station but another macro base station, the wireless communication system of each of the embodiments can effectively function. Incidentally, because mobile stations need not be registered in the macro base station, if the macro base station transmits control information addressed to other mobile stations to a certain mobile station, it may be concerned that the mobile station that has received the control information may intercept data addressed to other users. However, because the ID of a mobile station serving as a true transmission destination is needed to acquire the control information, even the mobile station that has received the control information addressed to other mobile stations is prevented from intercepting data addressed to other users.

More specifically, the location of the control information in a control channel region is specified by the ID of a mobile station, and CRC (Cyclic Redundancy Check) scrambling is performed with the ID of the mobile station. Therefore, when a mobile station needs to acquire data to be transmitted to another mobile station of a neighboring base station based on the control information on the neighboring base station, the mobile station needs to know the ID of the mobile station assigned by the neighboring base station in advance. Therefore, the above concern can be reduced. In addition to the ID of the mobile station, some pieces of information are also needed, such as the location of a PHICH (Physical Hybrid ARQ Indicator CHannel) in the control channel region or a PDCCH (Physical Downlink Control CHannel) format, to enable the mobile station to receive signals of other cells. Therefore, even when the wireless communication system of the embodiments is applied to the macro base stations, a user of the mobile station can be prevented from intercepting data addressed to other users.

According to one embodiment of the wireless communication system of the disclosed technology, it is possible to reduce interference by a home base station and improve the reception characteristics of data transmitted by a macro base station.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system comprising:
a macro base station;
a home base station; and
a mobile station that receives a wireless signal containing a transmission signal of the macro base station and a transmission signal of the home base station, wherein
the macro base station includes a processor, wherein the processor executes a process comprising:
notifying the home base station of a timing at which the macro base station transmits data to the mobile station,
the home base station includes a processor, wherein the processor executes a process comprising:
transmitting control information to the macro base station at the timing notified, and
the mobile station includes a processor, wherein the processor executes a process comprising:
transmitting information to the macro base station, the information indicating that the mobile station enables interference reduction;
first receiving first control information used for a process of receiving the transmission signal of the macro base station; and
second receiving, from the home base station, second control information used for a process of receiving the transmission signal of the home base station, the second control information being transmitted to the mobile station in response to a request sent by the macro base station.

2. The wireless communication system according to claim 1, wherein the mobile station processor further executes a process comprising:
demodulating and decoding a signal based on the first control information, the signal being obtained by reducing a component of the transmission signal of the home base station from the wireless signal by using information that is obtained by demodulating and decoding the transmission signal of the home base station based on the second control information.

3. A mobile station that receives a wireless signal containing a transmission signal of a macro base station and a transmission signal of a home base station, the mobile station comprising a processor, wherein the processor executes a process comprising:
transmitting information to the macro base station, the information indicating that the mobile station enables interference reduction;
first receiving first control information used for a process of receiving the transmission signal of the macro base station;
second receiving, from the home base station, the second control information used for a process of receiving the transmission signal of the home base station, the second control information being transmitted to the mobile station in response to a request sent by the macro base station; and
demodulating and decoding a signal based on the first control information, the signal being obtained by reducing a component of the transmission signal of the home base station from the wireless signal by using information that is obtained by demodulating and decoding the transmission signal of the home base station based on the second control information, wherein
the macro base station notifies the home base station of a timing at which the macro base station transmits data to the mobile station, and
the home base station transmits the control information to the macro base station at the timing notified.

4. A base station that is connected to a mobile station configured to receive a wireless signal containing a transmission signal of the base station and a transmission signal of another base station, the base station comprising a processor, wherein the processor executes a process comprising:

receiving, from the other base station, control information used to demodulate and decode the transmission signal of the base station;

receiving, from the mobile station, information indicating that the mobile station enables interference reduction for signals of the base station;

notifying the other base station of a timing at which the base station transmits data to the mobile station, the other base station transmitting the control information at the timing notified; and transmitting the control information to the mobile station in response to a request sent by the other base station.

5. A wireless communication method for a wireless communication system that includes a macro base station, a home base station, and a mobile station that receives a wireless signal containing a transmission signal of the macro base station and a transmission signal of the home base station, the wireless communication method comprising:

notifying, by the macro base station, the home base station of a timing at which the macro base station transmits data to the mobile station;

transmitting, by the home base station, the control information at the timing notified to the macro base station;

transmitting information to the macro base station, the information indicating that the mobile station enables interference reduction;

receiving, by the mobile station, first control information used for a process of receiving the transmission signal of the macro base station, and second control information used for a process of receiving the transmission signal of the home base station, the second control information being transmitted to the mobile station in response to a request sent by the macro base station; and demodulating and decoding, by the mobile station, a signal based on the first control information, the signal being obtained by reducing a component of the transmission signal of the home base station from the wireless signal by using information that is obtained by demodulating and decoding the transmission signal of the home base station based on the second control information.

6. A wireless communication method for a mobile station that receives a wireless signal containing a transmission signal of a macro base station and a transmission signal of a home base station, the wireless communication method comprising:

transmitting information to the macro base station, the information indicating that the mobile station enables interference reduction;

receiving first control information used for a process of receiving the transmission signal of the macro base station, and second control information used for a process of receiving the transmission signal of the home base station, the second control information being transmitted to the mobile station in response to a request sent by the macro base station; and demodulating and decoding a signal based on the first control information, the signal being obtained by reducing a component of the transmission signal of the home base station from the wireless signal by using information that is obtained by demodulating and decoding the transmission signal of the home base station based on the second control information, wherein the macro base station notifies the home base station of a timing at which the macro base station transmits data to the mobile station, and the home base station transmits the control information to the macro base station at the timing notified.

7. A wireless communication method for a base station connected to a mobile station that receives a wireless signal containing a transmission signal of the base station and a transmission signal of another base station, the wireless communication method comprising:

receiving, from the other base station, control information used to demodulate and decode the transmission signal of the base station;

receiving, from the mobile station, information indicating that the mobile station enables interference reduction for signals of the base station;

notifying the other base station of a timing at which the base station transmits data to the mobile station, the other base station transmitting the control information at the timing notified; and transmitting the control information to the mobile station in response to a request sent by the other base station.

8. A wireless communication system comprising:

a macro base station;

a home base station; and a mobile station that receives a wireless signal containing a transmission signal of the macro base station and a transmission signal of the home base station, wherein the mobile station includes a first processor, wherein the first processor executes a process comprising:

transmitting information to the macro base station, the information indicating that the mobile station enables interference reduction; and receiving, from the home base station, control information used for a process of receiving the transmission signal of the home base station, the control information is transmitted to the mobile station in response to a request sent by the macro base station, the macro base station includes a second processor, wherein the second processor executes a process comprising:

notifying the home base station of a timing at which the macro base station transmits data to the mobile station;

receiving the information transmitted by the mobile station; and transmitting a request signal to request transmission of control information used for a process of receiving the transmission signal of the home base station, to the home base station upon reception of the information, and the home base station includes a third processor, wherein the third processor executes a process comprising:

receiving the request signal transmitted by the macro base station; and transmitting the control information used for a process of receiving the transmission signal of the home base station, in response to reception of the request signal at the timing notified by the macro base station.

* * * * *